US012639429B1

(12) United States Patent
Lee

(10) Patent No.: US 12,639,429 B1
(45) Date of Patent: May 26, 2026

(54) TRUSTED SENSOR INGRESS LAYER (TSIL): RECEIPT-GATED, FAIL-CLOSED SENSOR INGRESS WITH SIGNED-HEAD FRESHNESS

(71) Applicant: Yong Bok Lee, Sheridan, WY (US)

(72) Inventor: Yong Bok Lee, Sheridan, WY (US)

(73) Assignee: Silent Authority LLC, Sheridan, WY (US)

( * ) Notice: Subject to any disclaimer, the term of this patent is extended or adjusted under 35 U.S.C. 154(b) by 0 days.

(21) Appl. No.: 19/405,693

(22) Filed: Dec. 2, 2025

Related U.S. Application Data

(60) Provisional application No. 63/881,810, filed on Sep. 15, 2025.

(51) Int. Cl.
G06F 21/55 (2013.01)
G06F 21/30 (2013.01)

(52) U.S. Cl.
CPC ............ G06F 21/554 (2013.01); G06F 21/30 (2013.01); G06F 2221/034 (2013.01)

(58) Field of Classification Search
None
See application file for complete search history.

(56) References Cited

U.S. PATENT DOCUMENTS

| | | | |
|---|---|---|---|
| 5,499,294 | A | 3/1996 | Friedman et al. |
| 6,393,126 | B1 | 5/2002 | van der Kaay et al. |
| 8,457,346 | B2 | 6/2013 | Rodriguez et al. |
| 9,300,678 | B1 | 3/2016 | Stack et al. |
| 9,621,565 | B2 | 4/2017 | Stack et al. |
| 9,759,816 | B2 | 9/2017 | Achanta |
| 9,813,173 | B2 | 11/2017 | Achanta et al. |
| 10,276,175 | B1 | 4/2019 | Garcia |
| 10,375,050 | B2 | 8/2019 | Lyons et al. |
| 10,527,732 | B2 | 1/2020 | Sagen et al. |
| 10,581,613 | B2 | 3/2020 | Ford et al. |

(Continued)

OTHER PUBLICATIONS

Laurie, Messeri, Stradling, "Certificate Transparency Version 2.0," RFC 9162, IETF, Dec. 2021.

(Continued)

*Primary Examiner* — Bradley W Holder

(57) ABSTRACT

Systems and methods for receipt-gated, fail-closed sensor ingress at the OS/HAL boundary. A portion of acquisition executes in a trusted boundary; each event is deterministically canonicalized into a Sensor Receipt (S2), signed, and its commitment anchored to an append-only log that publishes signed heads and supports inclusion and append-only-evolution (consistency) proofs under a freshness policy. An ingress gate admits the event to an OS read/subscribe path only after successful validation within an admission latency budget; otherwise the system returns a Structured Precondition-Failure code and withholds the event. Optional active liveness (optical flicker, IR, ultrasonic) and multi-sensor consistency detect replay and spoofing. On PASS, a scope-bound, TTL-limited, single-use sensor-permit may be minted to authorize read/subscribe. A verifier may emit a digitally signed Certification Result and, optionally, a Sensor Integrity Score. Zero-knowledge predicates may prove policy satisfaction without revealing raw sensor values. The rail yields portable, independently verifiable evidence of policy-compliant sensing.

30 Claims, 11 Drawing Sheets

(56) References Cited

U.S. PATENT DOCUMENTS

Figure 1:
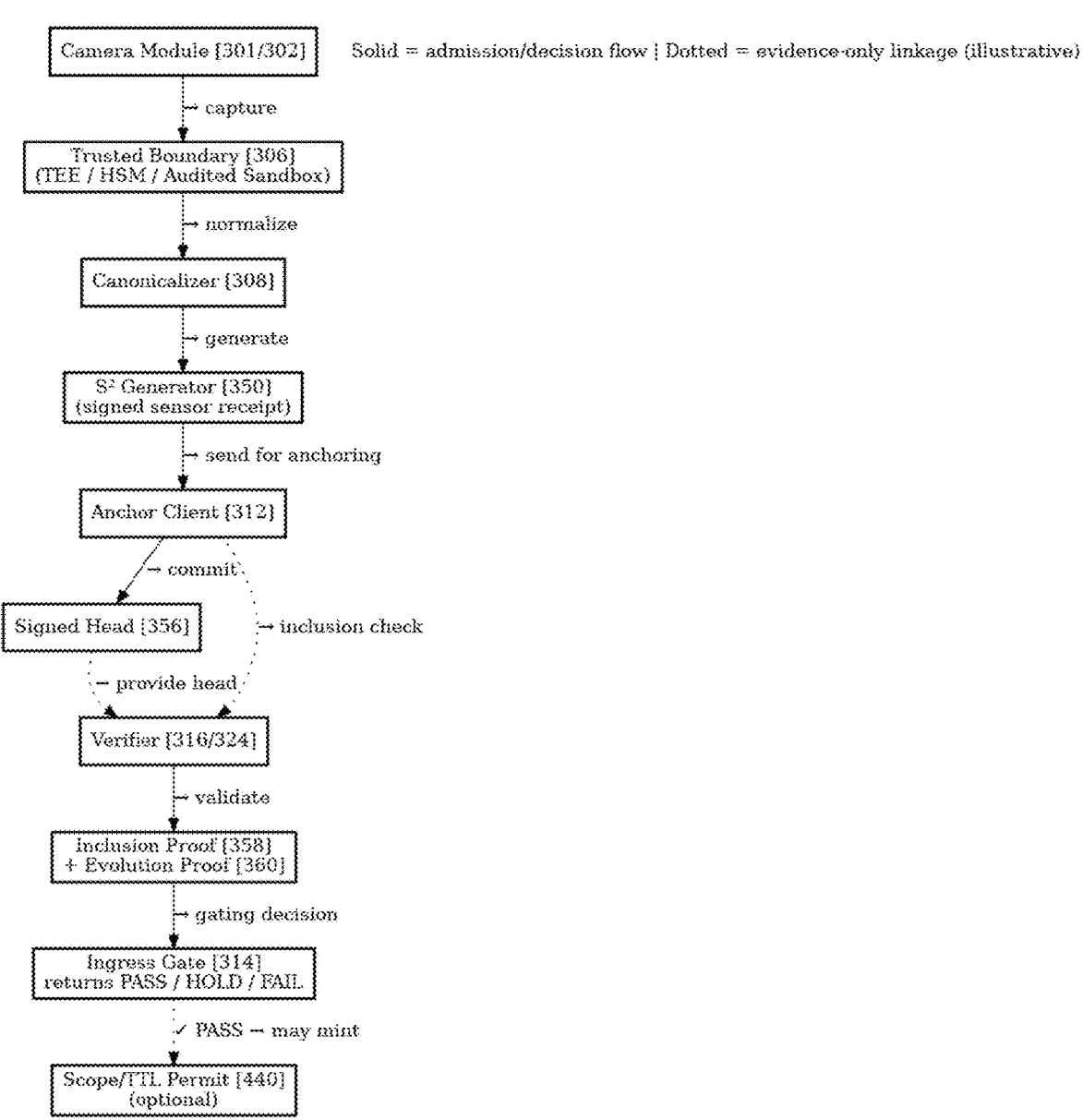

| | | | |
|---|---|---|---|
| 11,463,268 | B2 | 10/2022 | Dittmann et al. |
| 11,469,904 | B1 | 10/2022 | Kats et al. |
| 11,741,219 | B2 | 8/2023 | Zeng et al. |
| 2015/0047528 | A1* | 2/2015 | Heaton .................... B61D 1/04 |
| | | | 104/89 |
| 2016/0121912 | A1* | 5/2016 | Puttagunta ............ B61L 23/041 |
| | | | 701/19 |
| 2016/0221592 | A1* | 8/2016 | Puttagunta .............. B61L 27/04 |
| 2019/0319835 | A1* | 10/2019 | Mansfield ........... B61L 15/0081 |

OTHER PUBLICATIONS

Crosby, Wallach, "Efficient Data Structures for Tamper-Evident Logging," Proc. 18th USENIX Security Symp., Aug. 2009.

Rundgren, Jordan, Erdtman, "JSON Canonicalization Scheme (JCS)," RFC 8785, IETF, Jun. 2020.
Bormann, Hoffman, "Concise Binary Object Representation (CBOR)," RFC 8949, IETF, 2020.
Schaad, "CBOR Object Signing and Encryption (COSE): Algorithms," RFC 9053, IETF, Aug. 2022.
Birkholz et al., "Remote ATtestation procedureS (RATS) Architecture," RFC 9334, IETF, Jan. 2023.
Intel Corp., "Intel SGX Data Center Attestation Primitives: ECDSA Quote Library API," Intel SGX DCAP Documentation, Mar. 2023.
Lundblade, Mandyam, Thaler, "The Entity Attestation Token (EAT)," RFC 9711, IETF, Apr. 2025.
Reed et al., "Decentralized Identifiers (DIDs) v1.0—Core Architecture, Data Model, and Representations," W3C Recommendation, Jul. 19, 2022.
Fernandez, Brito, Fetzer, "Triad: Trusted Timestamps in Untrusted Environments," arXiv:2311.06156, Dec. 2023.

* cited by examiner

FIG. 10

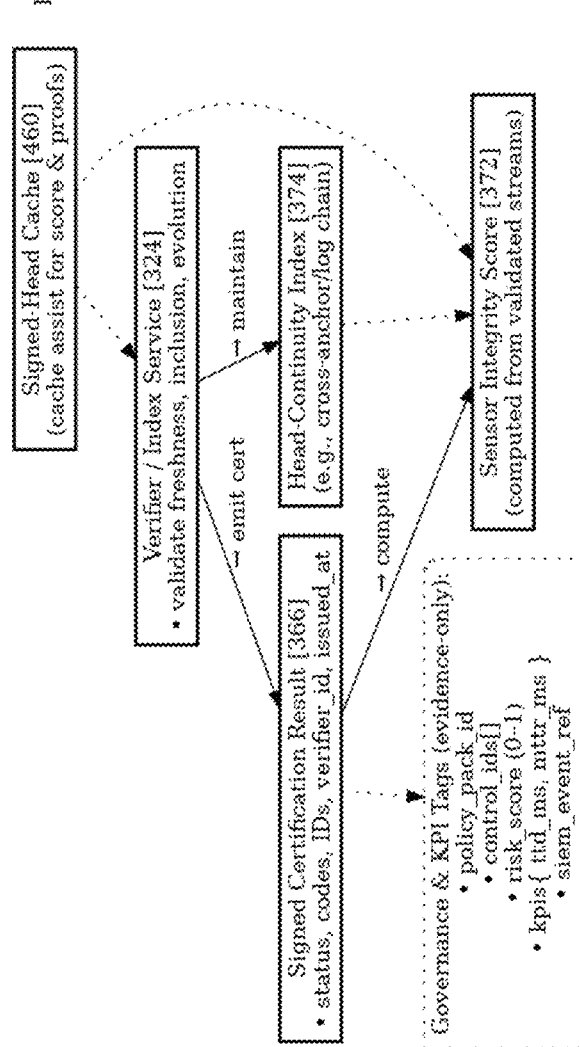

Dotted = cache or evidence-only metadata (illustrative)

Signed-Head Cache [460]
(cache assist for score & proofs)

Verifier / Index Service [324]
* validate freshness, inclusion, evolution

Head-Continuity Index [374]
(e.g., cross-anchor/log chain)

Sensor Integrity Score [372]
(computed from validated streams)

→ maintain

↳ emit cert

→ compute

Signed Certification Result [366]
* status, codes, IDs, verifier_id, issued_at

Governance & KPI Tags (evidence-only):
  * policy_pack_id
  * control_ids[]
  * risk_score (0-1)
  * kpis{ ttd_ms, mttr_ms }
  * siem_event_ref

TRUSTED SENSOR INGRESS LAYER (TSIL): RECEIPT-GATED, FAIL-CLOSED SENSOR INGRESS WITH SIGNED-HEAD FRESHNESS

CROSS-REFERENCE TO RELATED APPLICATIONS

Non-Trademark Notice. "Trusted Sensor Ingress Layer" and "TSIL" are technical labels/abbreviations for convenience only; no trademark rights are asserted. The scope of the invention is defined solely by the claims.

Priority and incorporation. This application claims the benefit of U.S. Provisional Application No. 63/881,810 (filed Sep. 15, 2025) under 35 U.S.C. § 119(e). The disclosure of the provisional application is incorporated by reference for non-essential subject matter only to the extent permitted by 37 C.F.R. § 1.57. In the event of any inconsistency, the present disclosure controls; all essential material supporting the claims is provided herein.

Notation & ASCII equivalence (illustrative; non-limiting). "S2" (ASCII) and "S$^2$" denote the same Sensor Receipt construct. ASCII names (e.g., SensorReceipt, S2) MAY be used in identifiers, hashing, schemas, and APIs; typographic labels MAY appear in prose/figures. This is notation only and non-limiting.

Interop pointers (communication only).

References in this specification to other rails or systems (for example, NOVACOV, UPTX, PAYGATE, TRC, SRBE-Rail, PoPC/ISL, AML-Gate, or UPL/URC) are shorthand labels for cross-rail interoperation scenarios and evidence-only references described in §§ [0006C]-[0006F] and in Appendices A and H. Unless expressly stated otherwise, no external document describing such systems is incorporated by reference; the present specification is self-contained and the claims control.

"Evidence-only" means a field or artifact consumed solely for audit/observability or RFP/compliance and DOES NOT alter TSIL gate predicates or admission/deny semantics; the claims control.

Except as expressly stated, no external document is incorporated by reference; functional equivalence examples are illustrative only.

FIELD OF THE INVENTION

Computer security, sensing systems, and operating-system middleware-specifically, receipt-gated sensor ingress that produces per-event Sensor Receipts (S2); anchors commitments to append-only logs (e.g., public, consortium, or private logs that publish signed heads and support inclusion and append-only evolution (consistency) proofs under a freshness policy); and enforces mint-after-verify for sensor read/subscribe at the OS/edge bus, with optional liveness and multi-sensor consistency checks.

Technical effects & computer-functionality improvements (Technical effects—illustrative; non-limiting). Implementations improve computer operation by: (i) moving verification into the sensor admission path (kernel/driver/HAL), (ii) binding admission to validated S2 under signed-head freshness and append-only evolution (consistency) proofs, (iii) enforcing fail-closed semantics within OS/edge latency budgets, (iv) providing standardized active liveness and multi-sensor consistency checks at ingress, and (v) emitting portable, machine-verifiable artifacts (S2/Certification Result/ EvidenceBundle) that reduce downstream reprocessing, replay, and spoofing.

Distinction from adjacent layers (illustrative; communication-only). TSIL addresses sensor ingress (inputs) at the device or operating-system boundary and is orthogonal to mid-stack policy and execution rails, such as: (1) TRC-class compositing rails that gate outputs or overlays before presentation, (2) NOVACOV-class verify-to-activation logic and purpose gates for agents, (3) PoPC/ISL-class intent and settlement rails that govern continuations and actions, (4) child- and safety-focused policy rails such as Kids AI Companion Safety Rail (K-ACSR) for child-AI companion episodes, and (5) multi-harm risk-budget engines such as SRBE-Rail. TSIL precedes perception and decision stacks and prevents spoofed or stale inputs before they influence models, user experience, or downstream execution, and its artifacts (for example, S2, Certification Results, and EvidenceBundles) MAY be consumed as evidence by such adjacent rails without changing TSIL gate predicates or claim scope; the claims control.

Appendices as part of the specification (illustrative; evidence-only). Appendices A-L form part of this specification and provide glossary entries, schemas, protocol sketches, conformance and audit mappings, reference builds, and threat-model notes. These materials aid enablement and procurement and are illustrative and evidence-only; the claims control, and gate predicates remain defined in the core specification.

Ethical use & public-interest posture (communication-only; non-limiting). TSIL is intended to reduce manipulation and mimicry in sensing pipelines—e.g., deepfake voice/ face, replay/relay of camera or audio, and spoofed RF/GNSS—so that vulnerable users (including minors and at-risk communities) are protected by default. This paragraph is illustrative and evidentiary only and does not limit or interpret the claims; the claims control.

Cross-rail handshake (communication-only; non-limiting). When a compositor rail (e.g., TRC) is present, downstream Reality Receipts (R$^2$) MAY reference one or more Sensor Receipts (S2) produced by this ingress rail to provide an end-to-end chain-of-custody (capture→overlay) for audit. These references are evidentiary only and do not alter TSIL gate semantics; the claims control.

Interop with NOVACOV/UPTX/PAYGATE (evidence-only; non-limiting). TSIL interoperates with Applicants' NOVACOV (logic-layer gate), UPTX (permit-carrying transport), and PAYGATE (payment authorization) via evidence objects: a TSIL Sensor Receipt (S2), Certification Result, or EvidenceBundle MAY be referenced (i) in a NOVACOV permit/IAL record, (ii) inside a UPTX Permit Evidence Tuple (PET) (e.g., as a receipt_core_digest or PET cross-reference), and (iii) inside a PAYGATE Transaction Evidence Tuple (TETpay) whose KDF context MAY include a receipt_core_digest. Parsers SHOULD ignore unknown cross-rail fields; interop references remain evidentiary only. These references are evidence only and do not alter TSIL ingress predicates; the claims control.

Underserved/Global-South deployment (advisory). TSIL is designed to operate in low-bandwidth/intermittent-power contexts via offline EvidenceBundles, snapshot freshness, Short-Permit (HOLD), and reduced TTL/recency profiles. These statements are advisory and do not alter gate predicates; the claims control.

Interop with Safety Risk Budget Engine Rail (SRBE-Rail) (evidence-only; non-limiting). In deployments that use a multi-harm Safety Risk Budget Engine to score AI safety episodes and emit structured Safety Evidence Receipts, TSIL artifacts (for example, Sensor Receipts (S2), Certification Results, or EvidenceBundles) MAY be consumed as sensor-level features or evidence inputs to such a risk engine. For instance, SRBE-Rail MAY treat TSIL S2 digests or EvidenceBundles as part of a Risk Vector or as cross-rail references in a Safety Evidence Receipt to provide end-to-end chain-of-custody from capture→perception/decision→safety evaluation. These cross-rail references remain evidentiary only and do NOT alter TSIL ingress gate predicates or PASS/HOLD/FAIL semantics; the claims control.

BACKGROUND

Sensor spoofing (GPS, audio replays, camera screen-replay), device re-feeds, and synthetic sensor streams can subvert downstream perception and decision systems. Existing controls focus on application permissions or post-hoc logs, not pre-admission proofs at the sensor bus.

There is no widely deployed ingress gate at the sensor HAL/bus that fails closed unless per-event, independently verifiable receipts validate under signed-head freshness and append-only evolution, nor one that standardizes active liveness and multi-sensor consistency at OS latency budgets.

Practical constraints (illustrative). Sensor buses service interrupt-driven or worker-deadline paths. Latency budgets are tight; blocking admission with heavyweight checks can cause ISR starvation, frame loss, or actuation jitter. Prior approaches avoided ingress checks due to such constraints.

Limitations of permission/log approaches (illustrative). Application-level permissions do not attest per-event authenticity; post-hoc logs cannot prevent real-time consumption of spoofed events. Ad-hoc liveness or cross-sensor checks, where present, lack portable receipts and independent verifiability.

Unmet need (illustrative). A standardized, receipt-gated ingress that can fail-closed at OS/edge speeds, validate under freshness/evolution proofs, and optionally enforce liveness/consistency is missing—and is addressed by TSIL.

SUMMARY OF THE INVENTION

TSIL is a computer-implemented sensor ingress rail. A sensor boundary executes a portion of acquisition within a trusted boundary; computes a per-event Sensor Receipt (S2); anchors a commitment to an append-only public log (signed heads; inclusion+append-only evolution (consistency) under a freshness policy); and admits the event to OS read/subscribe only after successful validation; otherwise fails closed with a Structured Precondition-Failure (code).

What is new (plain-language recap; illustrative). TSIL introduces per-event Sensor Receipts (S2) and a gate that only lets sensor events pass after cryptographic validation to a current signed head (and append-only evolution (consistency) on head advance). It standardizes optional liveness and multi-sensor consistency checks, and minting of sensor-permits that bind audience/scope/TTL to each admitted event.

Key properties (illustrative). Fail-closed admission; independent verifiability (S2/Certificate/EvidenceBundle); optional quorum (k-of-m); privacy via ZK predicates; modular deployment at HAL/driver/bus surfaces; compatible with public/consortium/private logs and functional equivalents.

In some embodiments, TSIL operates as a lower-layer rail in a broader Risk & Evidence operating system, in which per-event Sensor Receipts (S2), Certification Results, and EvidenceBundles emitted by TSIL are consumed as evidentiary inputs by higher-layer governance rails, such as clinical safety receipt layers and multi-harm Safety Risk Budget Engines. Such cross-rail uses are evidentiary only and do not alter TSIL gate predicates or PASS/HOLD/FAIL semantics; the claims control.

Optional active liveness challenges (including optical flicker, infrared, or ultrasonic watermarks) and multi-sensor consistency graphs (e.g., GPS-IMU-barometer-camera) detect replays/spoofs. A sensor-permit (scope/TTL/single-use) may be minted post-validation; a verifier emits Certification Results for policy consumers. Privacy is preserved via zero-knowledge predicates (e.g., zone/age/location class without raw disclosure).

Eligibility (illustrative; non-limiting). The disclosed rail improves computer functionality by relocating verification to the sensor admission path (kernel/driver/HAL surfaces); binding admission to validated S2 under signed-head freshness/append-only evolution; and enforcing fail-closed denial at OS/edge latencies. These are hardware/software control paths, not mental steps. Implementations alter kernel/driver/HAL control-flow for sensor admission under bounded budgets, producing machine-verifiable artifacts consumed by the OS/edge substrate, not by human judgment or abstract policies.

Implementations modify kernel/driver/HAL control-flow to enforce cryptographic freshness and fail-closed admission within OS/edge latency budgets; these are hardware/software control paths that improve the functioning of the computer itself, not mental steps.

Implementations change OS/HAL control-flow so that no read/subscribe path can observe samples unless inclusion and, on head advance, append-only evolution (consistency) validate under a freshness policy within a bounded admission slice.

Unlike generic logging or post-hoc analytics, implementations modify the operation of the computer itself by inserting a fail-closed sensor admission gate into the OS sensor bus and driver ring-buffer paths. Without TSIL, spoofed or stale sensor samples can flow through HAL and DMA queues; with TSIL, those control paths are rewired so that no read/subscribe call can observe sensor data unless cryptographic freshness and append-only evolution proofs validate within a bounded admission slice. This change to kernel/driver control flow constitutes an improvement to the functioning of the computer, not an abstract policy evaluation.

Advantages vs. conventional systems (illustrative). Reduces replay/spoof before consumption; lowers false-accept/false-reject by combining liveness+consistency; standardizes evidence for audits/insurers/regulators; minimizes app-by-app patches by enforcing at OS ingress.

Partner quick-start (non-limiting). OS/HAL vendors integrate the Ingress Gate and S2 generator; device/OEMs add liveness for relevant modalities; verifiers provide head cache+prefetch and Certification Results; policy consumers read Certificates/EvidenceBundles to gate safety-critical features.

SYSTEM ARCHITECTURE OVERVIEW

Purpose & planes. TSIL converts signal→S2→ anchor→ validate→admit/deny, separating a data/compute plane (sensor acquisition, canonicalization, anchoring) from a control/admission plane (validation, liveness/consistency, OS bus gating, sensor-permit minting).

Control loop narrative (illustrative). (1) Acquire raw event in a Trusted Boundary; (2) Canonicalize to a stable digest; (3) Sign S2 and anchor the commitment; (4) Validate inclusion (freshness) and evolution if head advanced; (5) Decide PASS/HOLD/FAIL at the Ingress Gate; (6) Admit event (and optionally mint permit) or deny with Structured Precondition-Failure (code); (7) Emit evidence (Certification Result/EvidenceBundle); (8) Optionally perform liveness/consistency checks per profile.

Modules (non-limiting). (i) Sensor Trusted Boundary (TEE/HSM/verified sandbox); (ii) Canonicalizer/Digestor; (iii) S2 Generator & Anchor; (iv) Ingress Gate at OS sensor HAL/bus; (v) Liveness Challenge Module; (vi) Consistency Verifier (multi-sensor DAG); (vii) Sensor-Permit Minter (scope/TTL/single-use); (viii) Privacy/ZK Engine; (ix) Verifier/Index (Certification Results; optional Sensor Integrity Score); (x) Policy-Consumer Interfaces (OS profiles, regulators, insurers, safety-cert labs).

Integration surfaces & equivalence (illustrative). Enforcement MAY occur at any functionally equivalent point: submit/admit on the bus, commit to driver ring buffers, present/notify to subscribers, or egress forward/record; names are illustrative and non-limiting. Admission SHOULD precede subscriber visibility.

Virtual/derived sensors (illustrative). TSIL applies to physical sensors and functionally equivalent virtual or derived sensor streams (e.g., pre-processed/fused outputs). Ingress enforcement MAY occur at a virtualization layer or gateway, provided admission still precedes subscriber visibility. Learned or derived streams (e.g., model pre-processing outputs) are treated as virtual sensors and are subject to the same S2 validation and freshness/continuity policies prior to admission. (Illustrative; non-limiting.)

Core artifacts. S2 includes at least boundary_measurement, input_digest, monotonic_counter, trusted_event_time, anti_replay. Certification Results record profile/status/codes/head_ids/verifier_id. Sensor-permits bind to S2/Scope digests; all may include version, capabilities[ ], ext{ }.

Artifact cross-walk (reader's aid; non-limiting).
S2=event-level receipt (what/when/how captured; anti-replay; anchor).
Certification Result=third-party/verifier decision (PASS/HOLD/FAIL+head ids).
Sensor-Permit=scope/audience/TTL-bound authorization for read/subscribe (optional).
EvidenceBundle=signed packet of proofs/heads/continuity for audit.
All are evidence-only for policy consumers; the gate semantics remain with the Ingress Gate. Note (evidence-only): The artifacts (S2, Certification Result, Sensor-Permit, EvidenceBundle) are consumed as evidence by policy consumers and do not alter Ingress Gate semantics.

Alias. "ReceiptCore," as used in external rails (e.g., PAYGATE), denotes a canonical subset of TSIL evidence (at least the S2 core fields and/or an EvidenceBundle digest) exported for cross-rail consumption; the alias is evidentiary only and does not alter ingress predicates.

Lifecycle (illustrative). 1) Acquire in Trusted Boundary→2) Canonicalize & hash→3) Sign S2; anchor→4) Validate inclusion (freshness) and append-only evolution (consistency) on head advance→5) If PASS, mint sensor-permit (optional) and admit event; if HOLD/FAIL, deny with Structured Precondition-Failure (code)→6) Liveness/consistency as policy requires→7) Verifier emits Certification Result; evidence is exportable (EvidenceBundle).

Failure semantics (illustrative). FAIL drops the event; HOLD may allow Short-Permit with down-sampled or masked values until quorum/continuity completes; PASS admits and may mint a permit. Denial returns machine-readable codes (e.g., PROOF_REQUIRED, SPOOF_DE-

6

TECTED, CONSISTENCY_FAIL, TIME_BUDGET_EX-CEEDED) with context/remediation.

Test vectors (illustrative; report-only). Representative conformance vectors for STALE HEAD, TIME BUDGE-T_EXCEEDED, CONSISTENCY_FAIL, SPOOF DETECTED/LIVENESS_REQUIRED, FRAME_INJECTION, and RELAY LATENCY DETECTED are listed in Appendix L; report-only, non-dispositive.

Timing. Implementations SHOULD use a local signed-head cache and warm-path prefetch to meet OS/edge latency budgets (e.g., ISR/worker deadline; values illustrative). Exceeding budget MUST map to TIME_BUDGET_EX-CEEDED.

Performance guidance (illustrative; non-limiting). Deployments SHOULD: maintain a local signed-head cache (TTL-bounded), prefetch proofs on active streams, and keep the ingress decision slice small relative to ISR/worker deadlines. Overruns MUST map to TIME_BUDGET_EX-CEEDED (fail-closed). VRR timing is in-scope; numeric budgets are illustrative.

Partner onboarding (non-limiting).
OS/HAL: patch [F1] gate and ship S2 generator; expose deny telemetry to SIEM/SOAR.
OEM: enable liveness for camera/mic/RF per TSIL-Auto or domain profile.
Verifier: stand up [F4] service (head cache+prefetch+quorum) and publish Certification Results.
Policy consumers: add "TSIL-Core or better" to RFPs; accept EvidenceBundles. Conformance note (illustrative; evidence-only). A Conformance Manifest and Certification Result format (with optional status stapling and cross-rail pointers) appear in Appendix E; evidence-only.

VII. BRIEF DESCRIPTION OF THE DRAWINGS

FIG. 1—Block diagram of a sensor-ingress pipeline including a trusted boundary, canonicalizer, Sensor Receipt (S2) generation, anchoring to a signed head, validation, and an ingress gate that admits or denies events before subscriber visibility.

Figure 2:
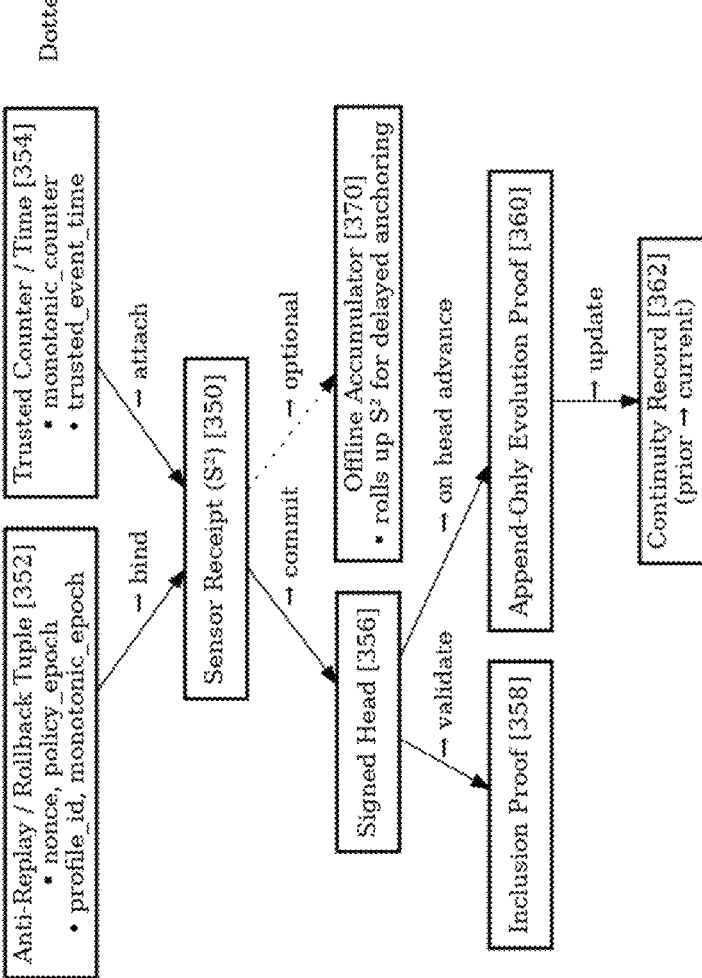

FIG. 2—Schematic of an S2 structure and associated freshness, inclusion, and append-only evolution (consistency) proofs, including a continuity chain and an optional offline accumulator.

Figure 3:
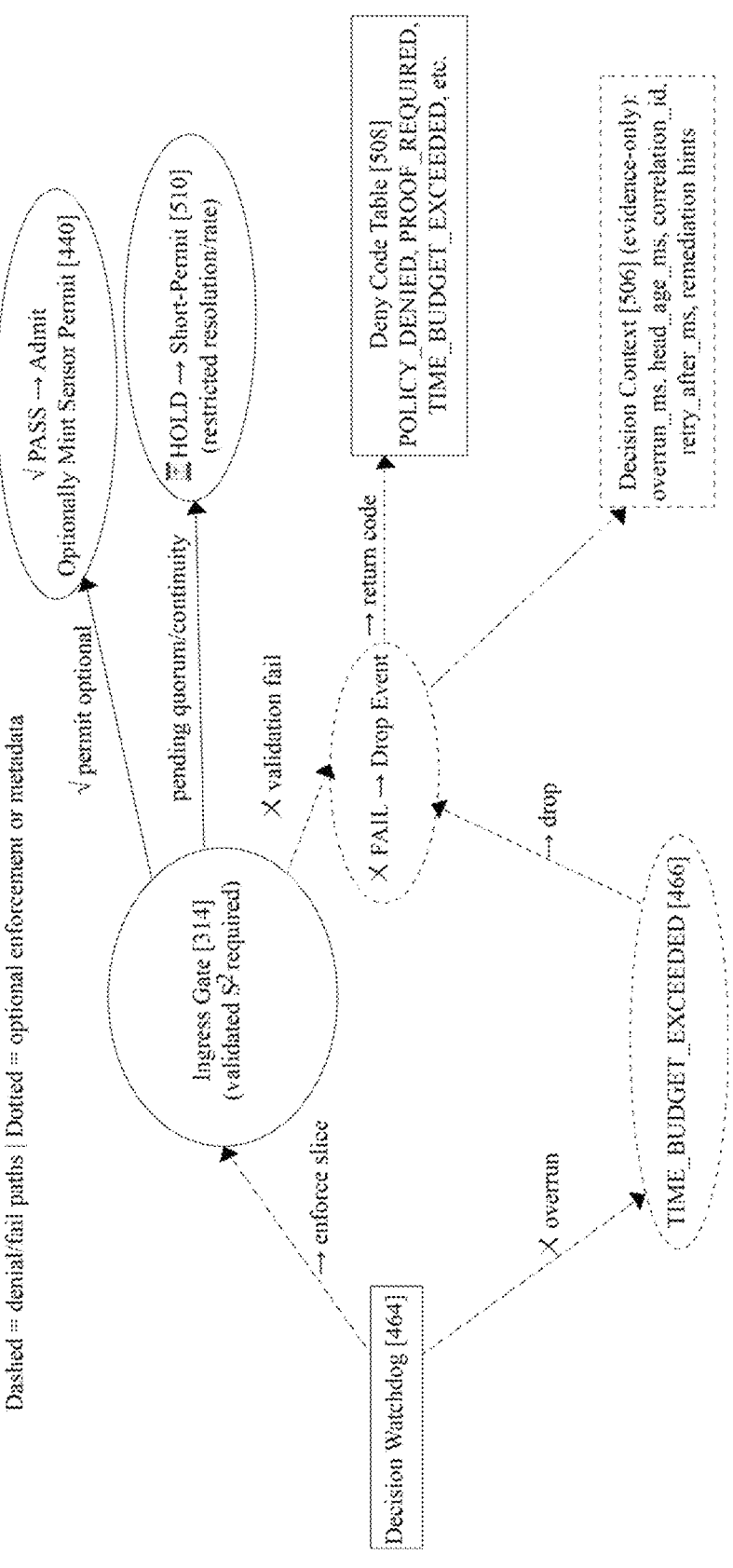

FIG. 3—State diagram of an ingress gate showing PASS, HOLD, FAIL transitions, deny-code mapping, and short-permit (HOLD) issuance.

Figure 4:
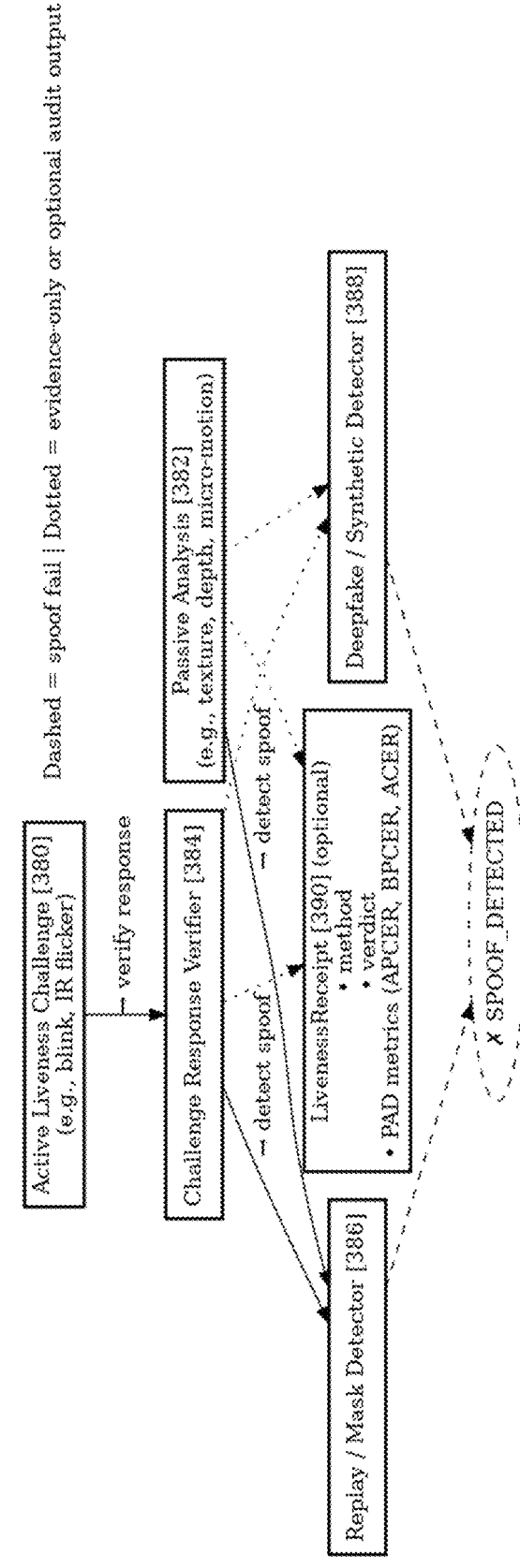

FIG. 4—Diagram of active (optical flicker/IR/ultrasonic) and passive (entropy/texture/micro-motion) liveness checks for anti-spoof, including replay/mask and deepfake detection.

Figure 5:
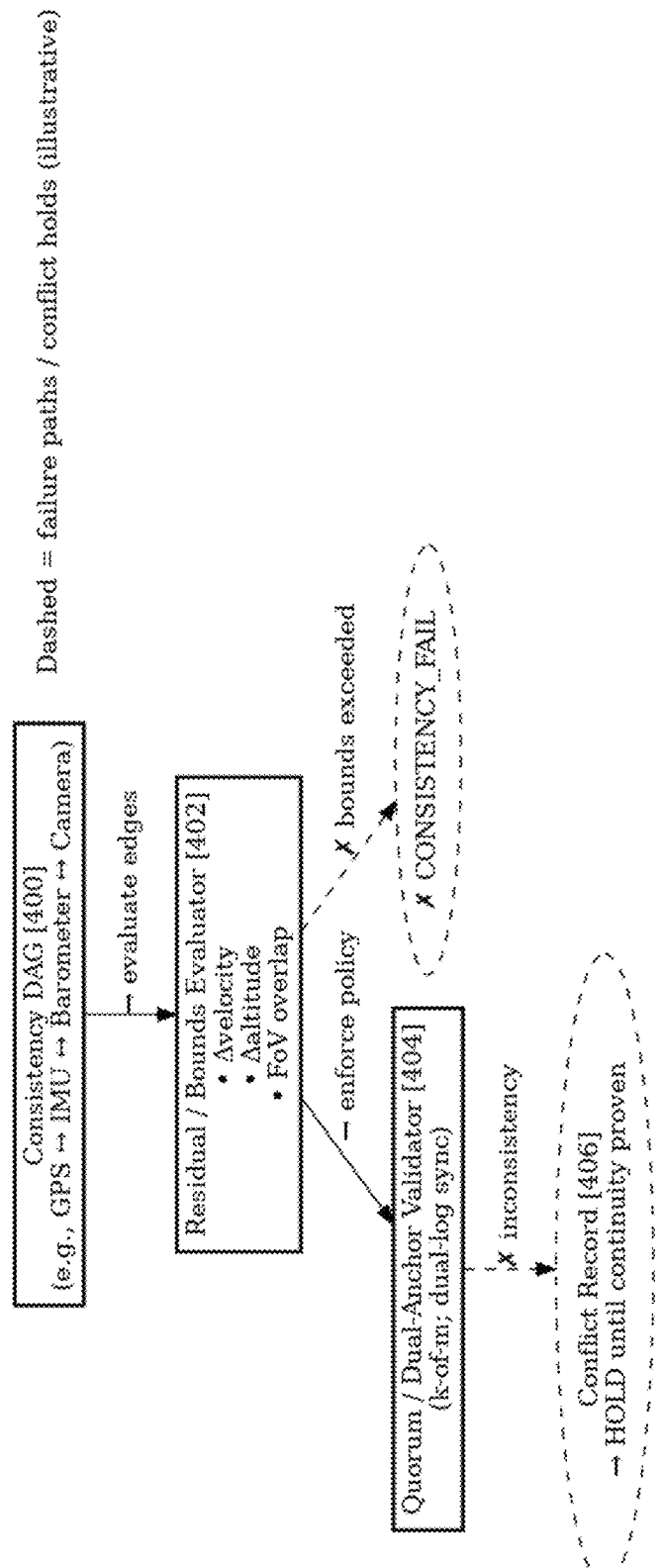

FIG. 5—Diagram of a multi-sensor consistency graph with residual/bounds evaluation and quorum/dual-anchor validation; contradictions map to CONSISTENCY_FAIL.

Figure 6:
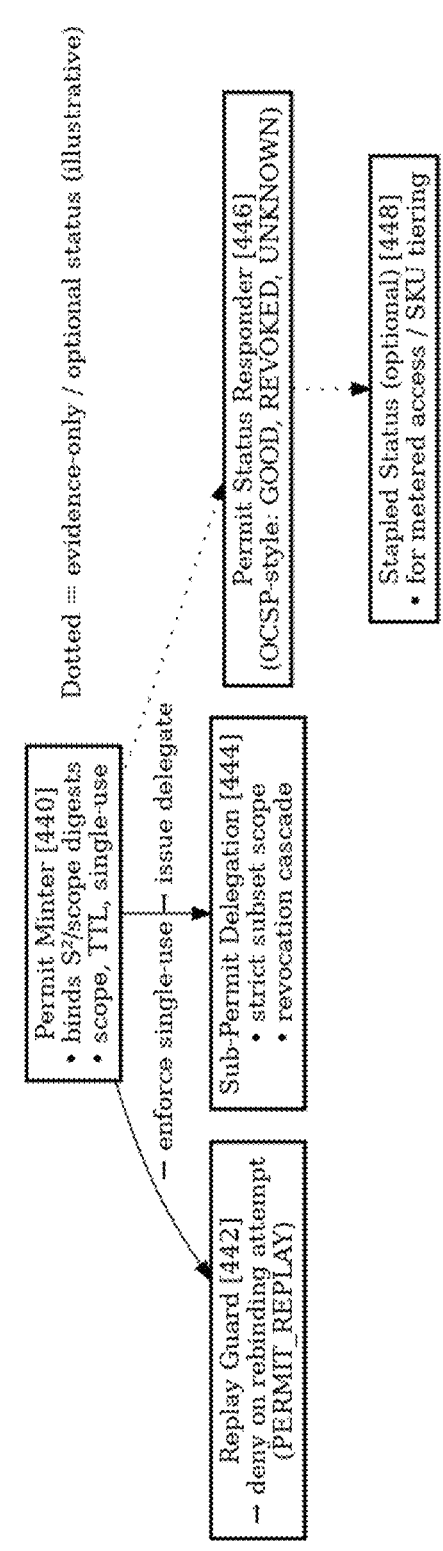

FIG. 6—Block diagram of mint-after-verify sensor-permit issuance, replay-guarding, delegation, and status stapling.

Figure 7:
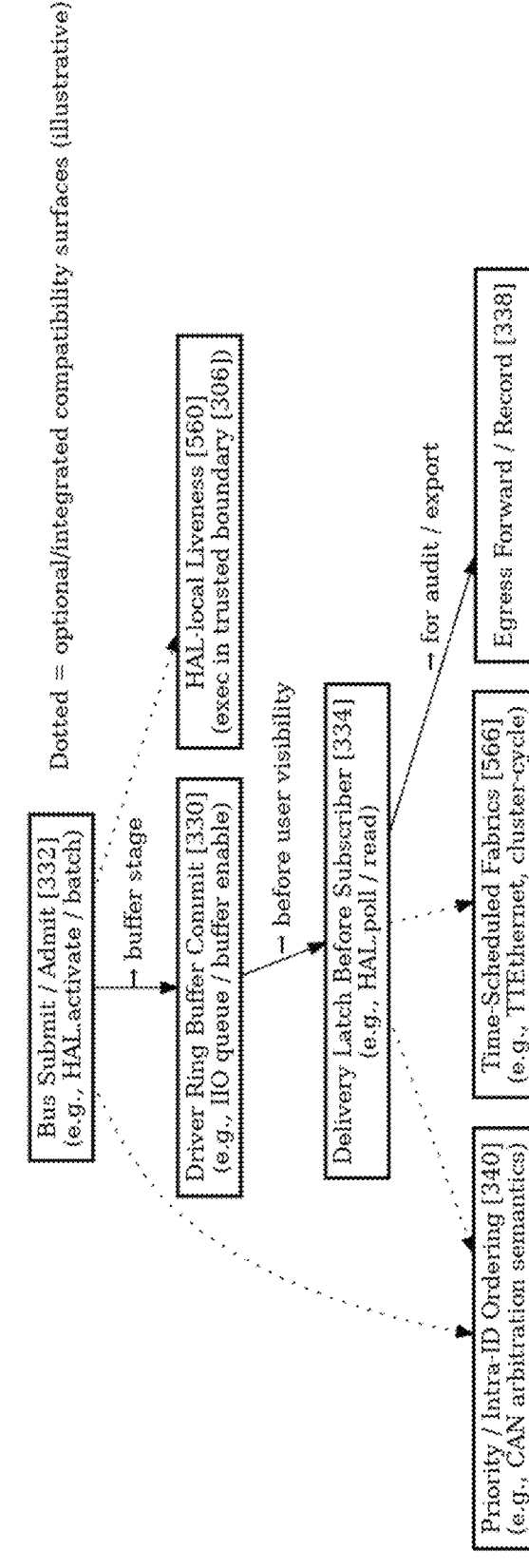

FIG. 7—Diagram of OS/HAL integration surfaces illustrating functionally equivalent admission points prior to subscriber visibility and queue/priority preservation.

Figure 8:
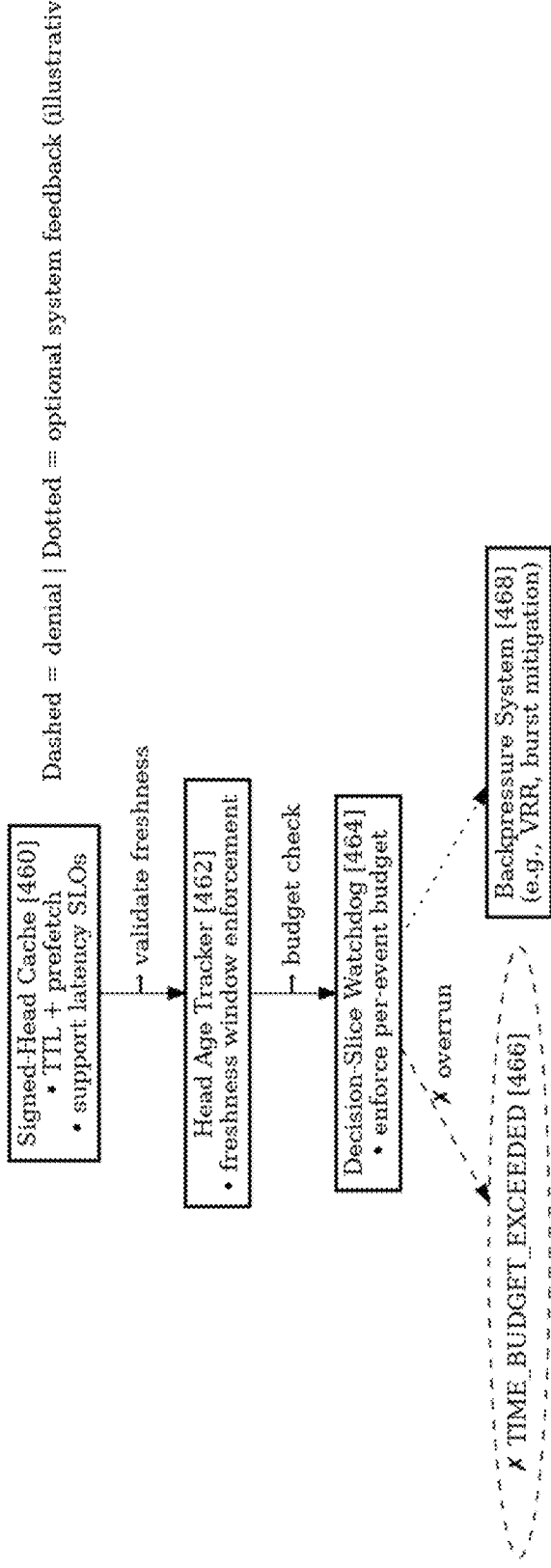

FIG. 8—Diagram of timing and cache mechanisms including a signed-head cache, head-age monitoring, a decision-slice watchdog, and backpressure.

Figure 9:
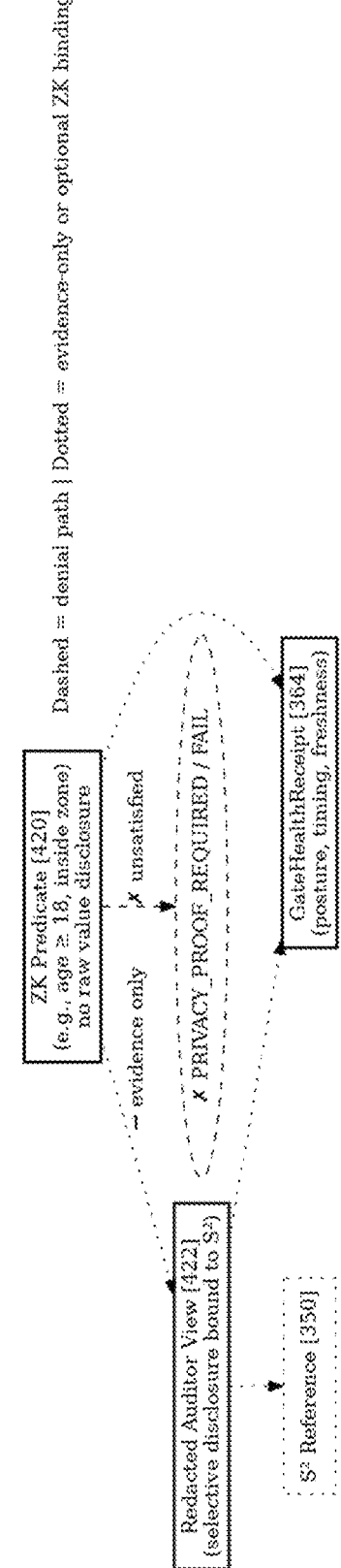

FIG. 9—Diagram of privacy & zero-knowledge predicate flows providing set/range proofs and redacted auditor views bound to S2.

FIG. 10—Block diagram of a verifier/index service that emits Certification Results and optionally computes a Sensor Integrity Score.

Figure 11:
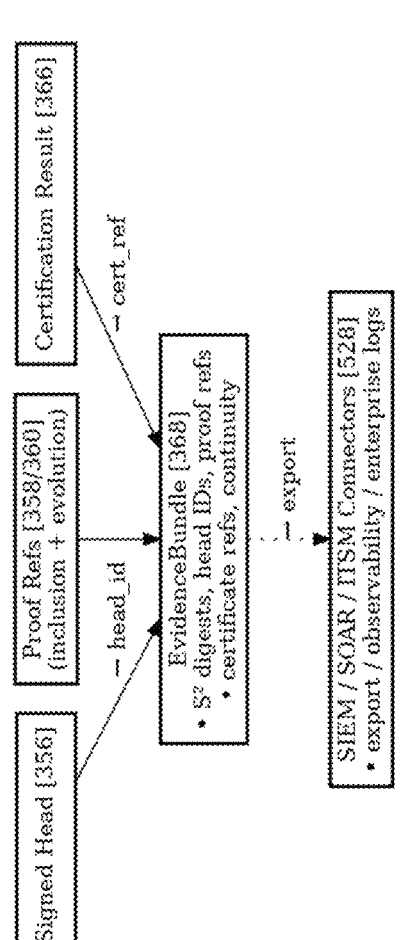

FIG. 11—Diagram of an EvidenceBundle packaging receipt digests, head identifiers, proof references, and certificate references for audit export.

REFERENCE NUMERALS

Core & Pipeline
    300 device (phone/HMD/auto ECU)
    301 camera module (RGB/IR/NIR)
    302 depth/ToF/structured-light projector
    304 sensor bus (MIPI CSI-2/parallel)
    306 sensor trusted boundary (TEE/SE/HSM)
    308 canonicalizer/digestor (frame/event)
    310 S2 generator (SensorReceipt signer)
    312 anchor client (log/ETL head submit)
    314 ingress gate (HAL/driver admission)
    316 verifier API client (proofs/k-of-m)
    318 policy engine (profiles/fences/budgets)
    320 subscriber interface (apps/ML pipeline)
    322 evidence exporter (SIEM/SOAR/ITSM)
    324 verifier/index service (cache/quorum/cert emit)
Bus & HAL Surfaces
    330 driver ring buffer (commit/queue)
    332 admission slice (activate( ) batch( )
    334 delivery path latch (before poll( ) read( )
    336 DMA/ISP bridge (pre/post-ISP latch)
    338 egress forward/record hook (copy/forward)
    340 queue/priority preserver (ID/order)
Receipts & Anchoring
    350 S2 (sensor receipt core)
    352 anti-replay tuple (nonce/policy_epoch/profile_id)
    354 monotonic counter/trusted event time
    356 signed head (current log head)
    358 inclusion proof (freshness)
    360 append-only evolution (consistency) proof
    362 continuity chain (head sequence)
    364 GateHealthReceipt (posture/freshness)
    366 Certification Result (status/codes/heads)
    368 EvidenceBundle (audit package)
    370 local accumulator (offline rollup)
    372 Sensor Integrity Score (stream metric)
    374 head continuity index (verifier-side)
Liveness/Anti-Spoof
    380 active liveness controller (IR flicker/pattern)
    382 passive liveness analyzer (texture/micro-motion)
    384 challenge projector (structured-light/ToF)
    386 replay/mask detector (photo/video/3D mask)
    388 deepfake signal checker (face/voice artifacts)
    390 LivenessReceipt (method/verdict/PAD metrics)
Consistency & Quorum
    400 multi-sensor DAG (camera-IMU-barometer-GNSS)
    402 residual/bounds evaluator (FoV/velocity/altitude)
    404 quorum validator (dual-anchor k-of-m)
    406 head conflict recorder (split-view/hold)
Privacy & ZK
    420 privacy/ZK engine (set/range predicates)
    422 redacted auditor view (selective disclosure)
    424 in-zone/age-class proof (no raw frames)
    426 DPIA/audit refs (evidence-only)
Permits & Status
    440 sensor-permit minter (scope/TTL/single-use)
    442 permit replay guard (single-use latch)
    444 delegation/sub-permit (strict subset)
    446 permit status responder (OCSP-style)

448 stapled status (admission stapling)
Timing & Cache
    460 signed-head cache (TTL/prefetch)
    462 head_age monitor (MMD window)
    464 decision slice watchdog (budget timer)
    466 TIME BUDGET EXCEEDED latch
    468 rate limiter/backpressure unit
Calibration & Health
    480 CalibrationCertificate store (factory/field/self)
    482 SensorHealthStatus (GOOD/DEGRADED/FAIL)
    484 drift/bias monitor (ISP/AE/AF sanity)
    486 CALIBRATION EXPIRED deny mapper
Security & Anti-Bypass
    500 attested transport (sensor→gate path)
    502 MMU/IOVA guard (buffer aliasing control)
    504 egress latch (cast/mirror/remote block)
    506 idempotency/correlation IDs (deny context)
    508 deny-code table (SPOOF_DETECTED/STALE_HEAD/ . . . )
    510 short-permit (HOLD down-sample/mask)
Interop & Governance (Evidence-Only)
    520 CT signed-head reference (equivalents)
    522 C2PA manifest/claim-sig reference
    524 DID/verification-method reference
    526 ZK proof reference/status
    528 SIEM/SOAR/ITSM connectors
    530 governance/control IDs (ISO/IEC/NIST/GDPR/BIPA)
Profiles & Modes
    540 TSIL-Core (single-log freshness)
    542 TSIL-Pro (k-of-m quorum/continuity)
    544 TSIL-Privacy (ZK/redaction)
    546 TSIL-Auto (IR liveness/consistency/timing)
    548 TSIL-FaceKYC (PAD/LivenessReceipt)
    550 TSIL-KYC (Face/Voice multimodal/MFA)
Edge/Federated & Bridges
    560 edge inference (on-device HAL/TEE)
    562 federated model update (no raw frames)
    564 TSIL-Bridge (legacy gateway for CSI/USB/IP cams)
    566 time-scheduled fabric compatibility (TT-Ethernet/slots)
Marketplace/Training Pipeline (Templates)
    580 ingestion gate (dataset requires S2/Cert)
    582 listing badge/conformance manifest
    584 deny transcript logger (policy_denied/spoof)
    586 meter keys/audit salts (usage billing)
Misc/Accessibility
    590 accessibility bridge (privacy HUD/labels)
    592 machine-audible label (auditing)
    594 minors/school mode indicators
    596 short-receipt QR (advisory/offline)
Notes: Numerals are illustrative and non-limiting; names map to equivalent components and do not alter claim scope.

DETAILED DESCRIPTION OF THE INVENTION

Conventions

"MUST/SHOULD/MAY" follow RFC 2119/8174. Numerics are illustrative and non-limiting. No element invokes 35 U.S.C. § 112(f) absent "means for/step for." Append-Only Evolution (Consistency) Proof denotes that a current signed head descends from a prior head under an append-only invariant. "Structured Precondition-Failure (code)" means a machine-readable denial (code+context+optional remediation). Terms in UPPER CASE denote symbolic states or codes (e.g., PASS/HOLD/FAIL, SPOOF_DE- TECTED). Optional governance fields are evidence-only and non-dispositive; receivers SHOULD accept unknown keys.

Notation (illustrative; non-limiting). "S2 (Sensor Receipt)" is the canonical ASCII term used in identifiers, hashing, and schemas. "S2" is an alias used in prose/figures only; both denote the same construct. ASCII SHOULD be preferred in all machine-readable artifacts.

Referring to FIG. 1 (sensor-ingress overview; 301/302, 306, 308, 350, 312, 356, 316/324, 358/360, 314, 440). Capture occurs at the camera module (301/302) inside the trusted boundary (306); the canonicalizer (308) and S2 generator (350) produce a signed receipt anchored by the anchor client (312) to a signed head (356). A verifier path (316/324) validates inclusion and append-only evolution (consistency) (358/360) under a freshness policy before the ingress gate (314) issues PASS/HOLD/FAIL; on PASS a scope/TTL permit (440) MAY be minted. Solid arrows indicate admission/decision flow; dashed arrows indicate evidence-only linkages. (Illustrative; non-limiting.)

Domain Example—Medical Imaging (TSIL-Scan; illustrative; non-limiting). In a medical-imaging profile ("TSIL-Scan"), one or more modalities (for example, CT, MRI, X-ray, ultrasound, or other medical-imaging modalities that emit DICOM studies or series) capture image series whose acquisition path terminates in a Trusted Boundary at or near a modality console or department gateway. Each study or series is canonicalized to per-series or per-frame Sensor Receipts (S2) and anchored to a signed head; admission to a subscriber path (e.g., PACS/VNA ingress or AI triage) occurs only after validation under a freshness policy, otherwise the ingress gate returns a Structured Precondition-Failure code and withholds visibility. (See FIGS. 1-3 for the generic pipeline; names are illustrative; the claims control.)

Imaging pipeline (illustrative; no new figures). Scanner→TSIL gateway/proxy at the department edge→validate S2 (freshness; inclusion; append-only evolution upon head advance)→admit to PACS/VNA only on PASS. In some embodiments, AI triage services, AI-assisted reporting systems, billing or quality-compliance agents, or other workflow assistants MAY be invoked only when a Certification Result is stapled to the series, so that downstream decisions, alerts, and draft reports can be tied back to verifiable capture evidence. On PASS, an EvidenceBundle is exportable to regulators, insurers, or electronic medical records (EMRs). (Evidence-only; gate semantics unchanged and the claims control.)

DICOM mapping (illustrative). An S2-MED profile MAY carry study_uid, series_uid, sop_instance_uid, and an optional pacs_anchor {store_id, object_hash} as audit-only crumbs. Parsers SHOULD ignore unknown keys. Presence/absence is non-dispositive of admission. Functional equivalents to DICOM UIDs/VNA identifiers remain in scope. (Evidence-only.)

AI triage gating (illustrative). Admission of an AI triage job MUST bind to a validated S2 and contemporaneous Certification Result. Model identity MAY be recorded as audit-only (e.g., model_id, model_hash); failure to satisfy a model-attestation policy maps to MODEL_ATTEST_FAIL or PROOF_REQUIRED per profile. Denials remain Structured Precondition-Failures; admission occurs before subscriber visibility as taught in the core rail. (Evidence-only; claims control.)

Override capture (clinical) (illustrative). When policy allows a clinical override, the system records a signed cause_code and operator identity as audit-only evidence. Overrides DO NOT bypass admit-before-visibility. Downstream consumers MAY receive a Short-Permit (HOLD) stream (lower rate/resolution) pending continuity/quorum. (Evidence-only; gate semantics unchanged.)

Dual-anchor to PACS (illustrative). Deployments MAY operate a dual-anchor posture in which (i) the S2 commitment anchors to a signed head and (ii) a content-addressable hash for the PACS/VNA object is recorded as pacs_anchor. Divergence maps to PACS_ANCHOR_MISMATCH or HEAD CONFLICT with HOLD until continuity resolves. (Evidence-only.)

Calibration, health, liveness (illustrative). Admission MAY require a valid CalibrationCertificate for the modality; expiry maps to CALIBRATION EXPIRED. Liveness/anti-spoof MAY be required for specific modalities/contexts (e.g., ultrasound video kiosks), with failures mapping to LIVENESS_REQUIRED or SPOOF_DETECTED. Sensor health degradation MAY map to SENSOR HEALTH_FAIL per policy. (Evidence-only; see deny taxonomy.)

A. Sensor Trusted Boundary & Attestation

A trusted boundary (306) (TEE/HSM/verifiably deterministic audited sandbox) MUST attest before secret provisioning; keys are sealed to the boundary measurement. Functionally equivalent secure boundaries are in scope.

Attested transport (illustrative). Admission MAY require a channel binding between the trusted boundary and the ingress gate (e.g., SE/TPM-bound session keys, IOMMU/DMA protection, link-layer attestation); mismatch MUST map to PROOF_REQUIRED or PLATFORM_AT-TEST_FAIL per policy.

Hardware provenance (illustrative). Keys MAY be sealed to a sensor hardware identity (e.g., attestation key, unique sensor ID). S2 MAY carry a hardware_provenance summary; acceptance MAY be discounted or denied below a key-continuity threshold per policy.

B. Canonicalization & Sensor Receipt (S2) (FIG. 2)

Referring to FIG. 2 (S2 & proofs; 350, 352, 354, 356, 358, 360, 362, 370). An S2 (350) binds an anti-replay/anti-rollback tuple (352) and trusted counter/time (354) to a signed head (356); validation uses inclusion (358) and, on head advance, append-only evolution (consistency) (360). Continuity (362) links prior→current; a local accumulator (370) MAY roll up authenticated S2 digests for later anchoring in offline scenarios. (Illustrative; non-limiting.)

A Per-event inputs SHOULD be deterministically serialized (stable field order, locale-independent numerics, trimmed whitespace). S2 (350) MUST include at least: boundary_measurement, input_digest, monotonic_counter/ trusted_event_time (354). An anti-replay/anti-rollback tuple (352) MAY include nonce, policy_epoch, profile_id, device/ profile identifiers, and a monotonic_epoch and/or rollback-_window indicator (illustrative; non-limiting). A regression of the monotonic_epoch or validation outside the rollback-_window MUST map to HOLD or FAIL per policy (illustrative; non-limiting).

Canon examples (illustrative). For cameras, the canonical payload MAY include sensor mode, lens metadata, exposure/ISO/shutter, white-balance, and OIS/EIS state; for microphones, weighting bands/watermarks; for GNSS, constellation/PRNs and dilution-of-precision. These MAY be hashed into input_digest; numbers are illustrative. Schema note (illustrative; evidence-only). Canonical S2 v1.2 skeletons (including optional anti-abuse audit crumbs such as active_challenge, stream_params/transport_params, param_ commitment, latency_observed_ms, anomaly_flags) appear in Appendix B [B1]; artifacts are evidentiary only and do not alter TSIL gate semantics.

Minimality & optional fields (illustrative). The four core fields above and a signature are sufficient for validation; additional fields (e.g., liveness, consistency, continuity) MAY appear. Note (evidence-only): Presence or absence of such additional fields does not alter admission semantics.

Modality-agnostic scope (illustrative). S2 applies to camera (301), depth/ToF/structured-light (302), microphone, RF/GNSS, IMU, barometer, and functionally similar modalities; payloads are hashed/canonicalized, not exposed. Modalities include (illustrative) RGB, IR/NIR, structured-light/ToF/3D, and hyperspectral.

Event/radar modalities (illustrative). TSIL applies equally to event cameras (asynchronous pixel-change sensors) and radar streams; per-row or per-packet timing for such sensors is included in the canonicalized payload for S2 and is considered in continuity checks.

Application- and OS-level egress-trigger events (illustrative; non-limiting). In some embodiments, TSIL treats certain operating-system- or application-level egress-trigger events as virtual sensors whose events are treated as sensor events and admitted on a read/subscribe path. Non-limiting examples include screen-capture start or stop events, screen-recording start or stop events, initiation of a remote streaming session, file-upload actions, sharing intents, or similar user-interface events indicating that content is about to leave a device or be rendered to a user. For each such event, the system MAY mint a Sensor Receipt (S2), anchor a commitment to a signed head, and bind the event into an episode or context envelope for downstream policy rails (for example, child-safety rails, multi-harm Safety Risk Budget Engines, settlement rails such as PoPC/ISL, or compositor rails such as TRC). These cross-rail uses are evidentiary only and do NOT alter TSIL gate predicates or PASS/HOLD/FAIL semantics; TSIL continues to enforce admit-before-visibility semantics at ingress surfaces, while downstream rails decide whether and how the associated content is rendered, blurred, down-ranked, or blocked.

Remote-rendered streams, embedded browsers and ad-slots (illustrative; non-limiting). For remote-rendered video streams, embedded browsers, or ad-slots, TSIL MAY ingest content-category tags, jurisdictional or regional markers, age-rating tags, or functionally equivalent metadata as part of a context envelope bound to an S2 or EvidenceBundle. Such metadata can be consumed by child-safety rails or multi-harm safety-budget engines to determine policy outcomes (for example, whether a stream or slot SHOULD be rendered, restricted, blurred, down-ranked, or blocked). TSIL's role is to capture and attest to the evidence; policy evaluation and render/deny behavior remain with downstream rails. These metadata fields are evidence-only and do not alter TSIL admission/deny semantics; the claims control.

C. Anchoring & Proofs (Freshness; Inclusion; Evolution)

A commitment for each S2 (350) MUST be anchored to an append-only public/consortium/private log publishing signed heads (356). Verification MUST validate inclusion under a freshness policy (e.g., a maximum-merge-delay (MMD) window-commonly ~24 hours in transparency systems) and, upon head advance within policy, append-only evolution (consistency) (360) (prior to current). Logs/proofs are functionally equivalent if they provide signed-head freshness and append-only properties. Proof transport MAY be embedded, referenced, or verifier-retrieved; continuity (362) and offline accumulator (370) are supported (illustrative). Equivalence note (illustrative; evidence-only). Functional equivalents for signed heads, append-only evolution, privacy mechanisms, admission surfaces, offline continuity, and audit crumbs are set out in Appendix H.

Multi-GNSS cross-check (illustrative). A policy MAY require cross-system validation (e.g., GPS/Galileo/GLONASS/BeiDou) and/or navigation-message authentication where available; discrepancies map to GNSS_CROSS-CHECK_FAIL or HOLD pending continuity. (Illustrative; gate semantics remain as in § [0047]-[0048].)

Freshness tuning & cache TTL (illustrative). Deployments SHOULD set head-cache TTLs (460) and prefetch windows to keep head_age well under the MMD window (462); stale heads MUST map to STALE_HEAD or HOLD pending refresh. If head_age exceeds policy, the gate MUST treat the proof as stale and return STALE HEAD or HOLD with the remediation hint refresh_head. Protocol note (illustrative; evidence-only). A canonical verifier flow (freshness, inclusion/append-only evolution, anti-replay, deny mapping) is provided in Appendix D for search efficiency; illustrative only. Acceptance MUST NOT exceed the configured maximum-merge-delay window; exceeding it maps to STALE_HEAD or HOLD with a remediation hint to refresh the head.

D. Ingress Gate & State Machine (FIG. 3)

Referring to FIG. 3 (ingress gate state machine; 314, 440, 510, 508, 464, 466). Admission at the ingress gate (314) binds to a validated S2; PASS may mint a sensor-permit (440); HOLD may issue a short-permit (510) with reduced rate/resolution pending continuity/quorum; FAIL drops the event. Denials return Structured Precondition-Failures (code) using codes from (508); budget overruns map to TIME_BUDGET_EXCEEDED (466) enforced by the decision-slice watchdog (464). (Illustrative; non-limiting.)

The ingress gate (314) MUST admit events only after successful validation and MUST return a Structured Precondition-Failure (code) on deficit. Outcomes: PASS (admit/optionally mint permit (440)), HOLD (restricted/short-permit (510) until quorum/continuity), FAIL (drop event). Deny codes MAY include POLICY_DENIED, PROOF_REQUIRED, TIME BUDGET EXCEEDED (466), STALE_HEAD, CONSISTENCY_FAIL, SPOOF DETECTED, PERMIT REPLAY; codes are drawn from the deny-code table (508).

Ingress quorum (illustrative). Admission MAY require k-of-m validator diversity at ingress (e.g., device-local+network verifier); disagreement maps to HOLD with a signed conflict record (406) until continuity is proven.

Short-Permit (HOLD) (illustrative). Under policy, the gate MAY issue a provisional permit (510) with restricted resolution/rate while quorum/continuity completes; it MUST auto-expire or upgrade to PASS within the freshness window; no settlement/critical actuation is authorized in HOLD.

In HOLD, the ingress gate MAY emit down-sampled or redacted measurements with advisory labeling until continuity/quorum resolves; settlement or critical actuation remains unauthorized while in HOLD.

Decision context (illustrative). Denials MAY include overrun_ms, head_age_ms (462), missing proof[ ], idempotency_key, correlation_id (506), retry_after_ms, and remediation hints (e.g., refresh_head, request_quorum); these are evidence-only and do not alter gate semantics.

Quarantine Mode (illustrative; non-limiting). When the gate observes a policy-defined threshold of Structured Precondition-Failures for a sensor or device within a window, it MUST enter Quarantine Mode: isolate the sensor interface, restrict admission to the Short-Permit (HOLD) profile (down-sampled or masked), and emit a signed continuity record referencing the current head sequence. Quarantine persists until policy-defined remediation is observed (e.g., consecutive PASS rate above a threshold within a freshness window, a valid CalibrationCertificate, or an administrative release), after which the gate MAY revert to normal PASS/HOLD/FAIL operation.

E. Liveness/Anti-Spoof (FIG. 4)

Referring to FIG. 4 (liveness & PAD; 380, 384, 382, 386, 388, 390). Active challenges (380/384) and passive analyzers (382) detect presentation attacks; replay/mask detectors (386) and deepfake checks (388) map failures to SPOOF_DETECTED. A LivenessReceipt (390) MAY include method, verdict, and PAD metrics for audit/RFP (evidence-only). (Illustrative; non-limiting.)

Liveness challenge families (illustrative). Challenges MAY include structured-light patterns, chirped ultrasonic sequences, polarization/IR strobes, rolling-shutter micro-modulations, or mmWave phase patterns; responses MAY be verified via Time-of-Flight (ToF), phase delay, speckle-pattern stability, or functionally equivalent phenomena.

Modality scope. For camera/microphone/RF, the system MAY perform active liveness (optical flicker/IR pattern/ultrasonic watermark) (380/384) or passive entropy/texture/micro-motion tests (382); mismatch MUST map to SPOOF_DETECTED via the detectors (386/388). (Illustrative.)

Active vs. passive (illustrative). Liveness MAY be satisfied by active (challenge-response: blink/head turn/IR flicker) (380/384) and/or passive (AI/texture/depth/micro-motion) (382) methods. Profiles MAY select either or both; missing or failing liveness maps to LIVENESS_REQUIRED or SPOOF_DETECTED. (Illustrative; non-limiting.)

PAD evidence (illustrative). Liveness implementations MAY emit Presentation Attack Detection metrics (e.g., APCER, BPCER, ACER, EER) within a LivenessReceipt (390) for audit-only correlation; thresholds are selected on a validation split and do not alter gate semantics. (Illustrative; non-limiting.)

Spatial-audio liveness (illustrative). For microphone streams, multi-channel TDoA/beamforming features MAY be used to distinguish bona fide from replayed signals; failures map to REPLAY_DETECTED or LIVENESS_REQUIRED. (Illustrative.)

Acoustic provenance (RIR) (evidence-only). Implementations MAY record a Room-Impulse-Response (RIR) profile reference (rir_ref) or array geometry/TDoA summaries for audit; presence is evidence-only and does not alter gate semantics.

Profile-based requirement (illustrative). Profiles (e.g., TSIL-Auto) MAY require liveness for specific modalities and contexts (e.g., vehicle speed >0), mapping missing challenges to LIVENESS_REQUIRED. (Illustrative; non-limiting.)

F. Multi-Sensor Consistency (FIG. 5)

Referring to FIG. 5 (consistency DAG & quorum; 400, 402, 404, 406). A cross-modal DAG (400) encodes constraints; the residual/bounds evaluator (402) checks FoV/velocity/altitude. Policies MAY require dual-anchor/k-of-m via (404); disagreement is recorded by (406) and maps to HOLD until continuity is proven. (Illustrative; non-limiting.)

A consistency verifier MAY construct a graph across modalities (400) (e.g., GPS-IMU-barometer-camera) and MAY encode velocity/altitude/FoV bounds via the residual/bounds evaluator (402); contradictions MUST map to CONSISTENCY_FAIL. RF/GNSS proofs (time-of-flight, multi-tower) MAY be referenced in S2 extensions.

Angle-of-arrival (AoA)/spatial profiles (illustrative). Policies MAY include multi-antenna AoA checks for RF/GNSS and microphone-array TDoA/beamforming spatial consistency; mismatches map to AOA_MISMATCH or REPLAY_DETECTED per profile. (Illustrative; gate semantics unchanged.)

Magnetic-spoofing consistency (illustrative). Policies MAY include guard-sensor or ESD-coil corroboration for magnetic field anomalies (e.g., B-field over expected range, field gradients inconsistent with motion/IMU). Mismatches map to MAGNETIC_SPOOF or HOLD pending continuity. (Illustrative; gate semantics unchanged.)

Construction examples (illustrative). Edges MAY carry signed residuals (e.g., Avelocity, Aaltitude); thresholds are illustrative and policy-defined. G. Sensor-Permit Mint-After-Verify (FIG. 6)

Referring to FIG. 6 (permits, delegation & stapling; 440, 442, 444, 446, 448). On PASS, the permit minter (440) binds scope/TTL/single-use to S2/scope digests; the replay guard (442) blocks rebinding. Delegation (444) issues strict-subset sub-permits; a responder (446) serves OCSP-style status; stapling (448) MAY accompany admission for metered access and SKU tiering (evidence-only). (Illustrative; non-limiting.)

On PASS, a sensor-permit (440) (scope-bound, TTL-limited, single-use) MAY be minted, bound to S2/Scope digests and audience; rebinding attempts MUST map to PERMIT REPLAY (guard (442)). Delegation MAY issue sub-permits (444) strictly contained within the parent scope; revocation cascades.

Schema guidance (illustrative). Permits MAY include nbf/exp/ttl_s, permitted_ops[ ], resource[ ], and an optional status_ref (OCSP-style) (446); unknown fields SHOULD NOT break verifiers.

Status stapling (illustrative). Verifiers and intermediaries MAY staple recent Sensor-Permit status responses (446/448) to admission decisions to reduce responder load and enable metered access. (Illustrative; non-limiting.)

Status-stapling recency. A recency bound≤MMD applies to stapled permit status; stale staples map to STATUS_STALE or EVIDENCE_EXPIRED per profile. (Evidence-only; mapping is policy-driven.)

H. OS/HAL Integration Surfaces (FIG. 7)

Referring to FIG. 7 (submit/commit/latch/egress; 332, 330, 334, 338, 340, 560, 566). Enforcement surfaces include bus submit/admit (332), driver ring buffer commit (330), delivery-path latch before subscriber visibility (334), and egress forward/record hooks (338). Ingress preserves priority and intra-ID ordering (340); HAL-local liveness MAY execute inside the trusted boundary (560/306); time-scheduled fabrics (566) remain compatible. Admission MUST be enforced at submit and/or commit of the driver ring buffer such that no read/subscribe can observe samples prior to successful validation. (Illustrative; non-limiting.)

Equivalent enforcement surfaces include: (i) submit/admit at sensor bus (332); (ii) commit on driver ring buffer (330); (iii) present/notify to subscriber with a delivery latch (334); (iv) egress forward/record (338). Implementations MUST enforce admission before subscriber read/subscribe completes. Illustratively on Android, enforcement occurs at the Sensors HAL admission slice (activate( )/batch( )) (332) before poll( ) delivers events (334); on Linux IIO/Media, enforcement occurs at buffer enable/queue (330) before userspace read( )/poll( ) can observe samples (334); queue/priority preservation (340). Names of admission surfaces are illustrative; function controls provided gating precedes subscriber visibility.

Ingress SHOULD preserve priority and intra-ID ordering consistent with bus semantics (e.g., CAN frame arbitration/ ordering) (340) while enforcing fail-closed admission. Liveness inference MAY execute on-device/at HAL inside the trusted boundary (560/306) to minimize latency and data egress; federated learning MAY update models without sharing raw data (illustrative; non-limiting).

TSIL admission is compatible with time-scheduled network fabrics (e.g., time-triggered/cluster-cycle domains such as TTEthernet) (566); gating occurs before subscriber delivery and coexists with deterministic slots (illustrative; non-limiting).

Platform mapping (illustrative). Typical surfaces include Linux IIO/Media stack, Android Sensor HAL/Camera HAL, Windows Sensors API, iOS Core Motion/AVFoundation—names are illustrative; equivalents are in scope. Reference builds (illustrative; evidence-only). Production-style realizations (e.g., HAL/Bus Gate, Verifier Service, TSIL-Bridge, IP-Camera/RTSP Gateway) are cataloged in Appendix F; examples are illustrative and do not alter gate semantics.

Fusion-Header & alignment invariants (illustrative). A Fusion-Header is a small, decoder-independent header that encodes an event-window cadence and timing anchors to preserve Δt alignment, ROI continuity, and occlusion-plane ordering across random-access points during multi-sensor composition.

I. Timing & Cache (FIG. 8)

Referring to FIG. 8 (timing, cache & budgets; 460, 462, 464, 466, 468). A signed-head cache (460) with TTL/prefetch helps satisfy latency SLOs; head_age (462) enforces freshness windows. The decision-slice watchdog (464) bounds compute per event; overruns map to TIME_BUDGET_EXCEEDED (466); optional backpressure (468) mitigates bursts (evidence-only). (Illustrative; non-limiting.)

Implementations SHOULD maintain a local signed-head cache (460) and prefetch proofs to meet latency budgets (ISR/worker). Budget overrun MUST map to TIME BUDGET EXCEEDED (466) and denial for that decision; the decision slice watchdog (464) MAY enforce budget.

Illustrative latency SLOs (evidence-only): p95≤ingress_budget_ms; p99≤2×ingress_budget_ms with head_cache_ttl_ms tuned to keep head_age well under MMD. Values are illustrative; policy decides budgets; failure maps to TIME_BUDGET_EXCEEDED.

Timing sanity (illustrative). Policies MAY require a MEMS-oscillator-backed time sanity reference and drift bounds; excursions map to TIME_SANITY_FAIL or HOLD. Values are evidence-only and do not alter gate predicates.

VRR & slice budgeting (illustrative). For variable refresh or bursty sensors, decision slices SHOULD be bounded (e.g., ≤25% of budget), leaving headroom for ISR/service; numbers are illustrative; optional backpressure (468) MAY apply.

J. Privacy & Zero-Knowledge (FIG. 9)

Referring to FIG. 9 (privacy & ZK; 420, 422, 424, 364). Set/range predicates (420) prove policy satisfaction without raw disclosure; a redacted auditor view (422) binds selective disclosure to S2 (350); a GateHealthReceipt (364) MAY attest posture/timing/cache freshness for SIEM/SOAR correlation (evidence-only). (Illustrative; non-limiting.)

ZK predicates (420) MAY prove policy satisfaction (e.g., inside zone/region; age ≥18) without disclosing raw sensor values. Failures map to PRIVACY_PROOF_REQUIRED/FAIL. A redacted auditor view (422) MAY bind selective-disclosure to S2 (350).

ZK-liveness (illustrative). A zero-knowledge predicate MAY attest that a required liveness challenge was satisfied (e.g., flicker class 'IR-A') without revealing raw frames; failure maps to PRIVACY_PROOF_REQUIRED/FAIL. (Illustrative; non-limiting.)

Health attestations. A GateHealthReceipt (364) MAY be emitted (signed; anchorable) asserting gate posture, timing posture, and cache freshness; consumers SHOULD prefer signed receipts over unauthenticated UI/status to mitigate spoofed security alerting. (Illustrative; non-limiting.)

Privacy variants (illustrative). In addition to ZK, policies MAY be satisfied via MPC or trusted-boundary evaluation that emits only redacted/verdict outputs; presence/absence does not alter gate semantics.

Examples (illustrative). Set-membership (zone list), range (altitude/speed bounds), or not-in-set (prohibited beacon list). Proof systems are functionally equivalent if they provide comparable privacy/completeness guarantees.

K. Verifier, Certificates & Scores (FIG. 10)

Referring to FIG. 10 (verifier/index; 324, 366, 372, 374, 460). The verifier/index service (324) validates inclusion/evolution and emits a signed Certification Result (366); it MAY compute a Sensor Integrity Score (372) over validated streams and maintain a head-continuity index (374) with cache assist (460). Governance/KPI tags remain evidence-only and non-dispositive. (Illustrative; non-limiting.)

A verifier/index service (324) validates S2 proofs (freshness, inclusion, evolution; optional k-of-m quorum) and emits a signed Certification Result (366) (status, codes, receipt/head identifiers, verifier_id, issued_at). A Sensor Integrity Score (372) MAY be computed over validated streams using cache/continuity data (460/374). Note (evidence-only): The Sensor Integrity Score does not alter admission semantics.

Quorum diversity (illustrative). A policy MAY require anchors from independent operators, geo or org diversity, and map divergence to HOLD/HEAD_CONFLICT until continuity is proven. Evidence is exported in the continuity chain (374). Diversity MAY be across bus domains or log operators; disagreement yields HOLD/HEAD_CONFLICT until continuity is proven. Continuity chains and signed conflict records are evidentiary; admission semantics remain defined by the ingress gate and policy predicates. (Illustrative; non-limiting.)

Optional governance/KPI (illustrative). Certificates MAY carry policy_pack_id, control_ids[ ], a risk_score (0 . . . 1), kpis{ttd_ms, mttr_ms}, and observability refs (e.g., siem_event_ref)—evidence-only.

L. Evidence Export (FIG. 11)

Referring to FIG. 11 (EvidenceBundle; 368, 356, 358/360, 366, 528). An EvidenceBundle (368) packages receipt digests, head IDs (356), proof references (358/360), and certificate references (366) for audits/policy consumers; deployments MAY export to SIEM/SOAR/ITSM connectors (528) and align to enterprise log taxonomies. Evidence is audit-only and non-dispositive. (Illustrative; non-limiting.) Audit mapping (illustrative; evidence-only). Example ATT&CK® application-log mappings and SIEM queries appear in Appendix I; report-only—no change to gate semantics.

EvidenceBundle fields (illustrative): {head_ids[ ], proof_refs[ ], receipt_core_digest, cert_result_ref, deny_code_histogram { }, latency_histogram { }, incident_id?}—evidence-only; gate unchanged.

Systems MAY export a signed EvidenceBundle (368) (S2 digests, head IDs (356), proof refs (358/360), certificate refs (366), continuity) for audits/policy consumers. Observability MAY include SIEM/SOAR/ITSM refs (528); unknown fields SHOULD NOT break clients. Note (evidence-only): EvidenceBundles are for audit/observability and do not alter gate semantics.

Training-pipeline admission (illustrative). Downstream pipelines MAY require S2/Certification Results (350/366) as preconditions for dataset ingestion or labeling; items lacking verifiable anchors map to POLICY_DENIED. (Illustrative; non-limiting.)

Retention & audit (illustrative; non-limiting). EvidenceBundles (368) MAY be retained per policy/regulation; legal hold MAY suspend disposal. Bundles are evidence-only and do not alter gate semantics. Threat model note (illustrative; evidence-only). Mappings of replay, split-view, relay/re-feed, IP-stream injection, and optical dazzle risks—and their evidentiary hooks—are summarized in Appendix G; illustrative only.

Economic & Partner Integration Annex (Illustrative; Non-Limiting)

Purpose. This Annex describes evidence-only fields, program surfaces, and integration templates that improve deployability and partner understanding. These materials are non-dispositive for gate semantics and do not narrow claim scope; the claims control.

A. Billing, Metering & Observability (Evidence-Only)

Decision metering (illustrative). Deployments MAY meter admission decisions using counters such as decisions_total, pass_total, hold_total, fail_total, and deny_code_ breakdown {code}. These are observability only (no semantic effect) and facilitate commercial reporting.

Evidence-only meter fields. Artifacts MAY carry optional, non-dispositive fields for billing/ops:

In Certification Result: decision_latency_ms, kpis {ttd_ms, mttr_ms}, risk_score.

In PreconditionFailure: overrun_ms, head_age_ms, idempotency_key, correlation_id.

In Sensor-Permit: status_ref (OCSP-style), permitted_ops[ ], resource[ ].

SIEM/SOAR/ITSM exports. Gateways and verifiers MAY export denial/allow telemetry to SIEM/SOAR/ITSM systems (siem_event_ref, soar_playbook_ref, itsm_ticket_id). Exports are evidence-only and used for audit/ops.

B. Governance-as-Code & RFP Mapping

Control mapping (illustrative). Certificates and EvidenceBundles MAY include policy_pack_id and control_ ids[ ] (e.g., "ISO27001-A.12", "GDPR-A32", "Auto-ASIL-B"), and an evidence_map[ ] linking controls to proof_ refs[ ]. Presence/absence is non-dispositive for gate semantics. Evidence artifacts MAY carry biometric_privacy_ refs[ ] (e.g., GDPR, BIPA) and standards_refs[ ] (e.g., ISO/IEC 30107-3 PAD, NIST Biometric Standards) for audit only; presence/absence does not alter gate semantics.

Identity-audit linkage (illustrative). EvidenceBundles MAY carry audit_refs[ ] to external identity logs (e.g., Microsoft Entra ApplicationManagement events for permission grant/revoke/consent) to support end-to-end investigations. (Evidence-only.)

RFP/Checklist language (template; non-binding).

"Vendor SHALL support TSIL-Core or better for camera/ mic/RF ingress."

"Certification Result SHOULD commit to receipt/head identifiers and be anchorable."

"Liveness MUST be active for vehicle speed >0 in TSIL-Auto profile."

C. Program Surfaces & Badging

Badge program (illustrative). A conformance badge MAY be issued upon passing test vectors (Appx. L). Badges are evidence-only; they MUST NOT alter gate semantics.

Profile tiers (communication only). Publish "TSIL-Core/ Pro/Privacy/Auto/Edge-Lite" as public descriptors of predicate bundles. Tiers are illustrative; functionally equivalent bundles remain in scope.

D. Calibration & Health (regulated domains)

Calibration validity. Where required by policy, a valid CalibrationCertificate is a precondition for admission; expiry MAY map to CALIBRATION_EXPIRED. Note (evidence-only): In deployments that do not require calibration for admission, a CalibrationCertificate MAY be carried as evidence only.

Sensor health status (evidence-only). A SensorHealthStatus object MAY report GOOD|DEGRADED|FAIL; thresholds are illustrative. Severe degradation MAY map to SENSOR_HEALTH_FAIL per policy. Health objects are non-dispositive for gate semantics.

E. Status & Revocation Services

Permit status responder (OCSP-style). A SensorPermitStatus endpoint MAY respond GOOD|REVOKED|EXPIRED|UNKNOWN with last_checked/next_update; responses MAY be stapled by intermediaries. Status artifacts are evidentiary; admission semantics remain with the Ingress Gate.

Head continuity service (illustrative). Verifiers MAY expose a signed head continuity index (head chain) to accelerate audits and reduce recomputation. The index is evidence-only.

F. Marketplace & Safety-Critical Templates

Marketplace listing gate (template; non-binding). "Sensor-produced assets MUST reference a valid S2 and Certification Result; submissions without verifiable anchors MUST be rejected." (Illustrative policy; no claim effect.)

Marketplace ingestion & listing. Stores/registries MAY require S2+CertificationResult for dataset ingestion and asset listing; submissions without verifiable anchors map to POLICY_DENIED (template; non-binding). Evidence exports follow DS0015-style application logs. (Illustrative; non-limiting.)

Safety-critical mode (communication only). In TSIL-Auto/Medical profiles, liveness MUST be active for specified modalities; missing challenge MAY yield LIVENESS_ REQUIRED. Numerical budgets and modality lists are illustrative.

G. Deployment & Integration Guidance

HAL/bus wiring (reader's aid; non-limiting). Typical integration points include submit/admit, commit to driver ring buffer, present/notify, and egress forward/record. Names are illustrative; any functionally equivalent enforcement that preserves fail-closed admission is in scope.

Edge-Lite continuity (intermittent links). Short-Permit (HOLD) MAY down-sample or mask values while proofs/ heads fetch in background. In offline conditions, the system MAY advance an authenticated local accumulator (e.g., a rolling commitment over S2 digests) and, upon reconnection, anchor that accumulator to a public/consortium log and obtain a continuity proof linking the local state to a current signed head (illustrative; non-limiting). On successful reconciliation within policy (e.g., within the MMD window), the gate MAY auto-upgrade to PASS; otherwise it MUST lapse to DENY per policy.

H. Economic Surfaces (Communication-Only; Illustrative)

Program levers. Partners MAY license (i) OS/HAL ingress gate, (ii) verifier/anchor service, (iii) liveness suite, (iv) status/responder, (v) conformance bench. Artifacts MAY support tiered offerings (Core/Pro/Auto/Enterprise). This paragraph is descriptive only.

Evidence-only pricing fields (optional). Artifacts MAY carry non-binding hints (plan_tier, feature_caps[ ]) for billing dashboards; these fields are evidence-only and MUST NOT alter gate semantics.

Meter keys & audit salts. Deployments MAY bind decision metering to per-tenant keys and audit salts (rotatable), enabling transparent usage billing without altering gate semantics. (Illustrative; non-limiting.)

I. Compatibility, Versioning & Deprecation

Semantic versioning (illustrative). Artifacts MAY use MAJOR.MINOR; parsers SHOULD ignore unknown fields; senders SHOULD dual-write during MINOR transitions; breaking changes in MAJOR only.

Equivalence reminders.

"Signed head" includes signed tree head, signed set head, or functionally equivalent accumulators.

"Append-only evolution (consistency)" includes any proof that the current head descends from a prior head.

"Fail-closed" includes DENY or HOLD with restricted rights pending proof completion. These are illustrative; the claims control.

Safety Case & Standards Alignment Annex (Illustrative; Non-Limiting)

Purpose.

This Annex explains how TSIL's evidence artifacts can populate safety/quality files. It is descriptive only and does not alter gate semantics.

Safety case placeholders. Deployments MAY reference S2, Certification Result, EvidenceBundle, CalibrationCertificate, SensorHealthStatus as inputs to safety cases under ISO 26262/IEC 61508/IEC 62304/DO-178C/EN 50128 (illustrative). Mapping is evidence-only.

Biometric PAD & auth standards (evidence-only). Deployments MAY reference ISO/IEC 30107-3 PAD (Presentation Attack Detection), FIDO UAF liveness/auth, and NIST SP 800-63B identity guidelines for audit only; presence/absence does not alter gate semantics. (Illustrative; non-limiting.)

Hazard mitigations (summary; illustrative).

(H01) Replay/Spoof→liveness, anti-replay, consistency.

(H02) Stale/forged evidence→signed-head freshness+ evolution, continuity chain.

(H03) Timing overrun→latency budgets, fail-closed TIME_BUDGET_EXCEEDED. Numbers and standards names are illustrative; equivalents are in scope.

Migration & Rollout Playbook (Illustrative; Non-Limiting)

Staged enablement. OS/HAL vendors MAY ship the Ingress Gate behind feature flags (per-modality/per-profile), enabling PASS-only logging→HOLD→PASS→full PASS/ HOLD/FAIL in phases.

Compatibility. Legacy subscribers continue to use read/ subscribe; admission happens before visibility. Unknown fields in artifacts SHOULD NOT break clients.

Telemetry & SLOs. Deployments MAY track decisions_total, deny_code_breakdown{ }, decision_latency_ms for capacity planning; telemetry is observability-only.

Policy Pack Examples (Illustrative; Non-Limiting)

TSIL-Auto sample (reader's aid). "Velocity>0⇒camera liveness REQUIRED; GNSS consistency with IMU REQUIRED; calibration valid; latency budget 5 ms; deny codes: LIVENESS_REQUIRED|CONSISTENCY_ FAIL|CALIBRATION_EXPIRED|TIME_BUDGET_EX-CEEDED."

TSIL-Privacy sample. "ZK statements: in_zone: US-CA, age ≥18; no raw frames exported; EvidenceBundle redacted."

(Templates are for comprehension; profiles remain advisory and non-dispositive.)

Key & Trust Management Annex (Illustrative; Non-Limiting)

Attestation roots & rotation. Trusted boundaries MAY chain to platform roots; key-continuity evidence (attested rotation logs, cert chains) MAY be recorded; acceptance MAY be discounted/denied below thresholds per policy. Evidence is non-dispositive for gate semantics.

Transparency & continuity services. Verifiers MAY publish a signed head-continuity index to accelerate audits; presence/absence has no semantic effect on admission.

Localization & Accessibility (Illustrative; Non-Limiting)

i18n of deny reasons. Precondition failures MAY include localized messages {"en-US": " . . . ", "ko-KR": " . . . "} for operator UX; codes remain canonical and machine-readable.

Accessible diagnostics. Implementations MAY expose advisory sounds/vibration for deny/HOLD states (no change to semantics).

Emergency Revocation & Incident Response (Illustrative; Non-Limiting)

Emergency policy. A deployment MAY declare an emergency posture in which specific modalities require HOLD by default until new heads/proofs load; artifacts MAY carry incident_id for linkage. Artifacts MAY carry an incident_id and shortened next_update for status responders to support emergency posture; incident fields are evidentiary only and do not alter gate semantics. During incidents or on repeated deny conditions, deployments MAY place one or more sensors into Quarantine Mode as defined in § VIII.[0051A].

Rapid revocation surfaces. Permit/Status responders MAY shorten next_update during incidents; EvidenceBundles MAY include incident metadata. These are evidence-only.

Interop Libraries (Illustrative; Non-Limiting)

Liveness library catalogue. The system MAY reference a pluggable liveness suite (e.g., ir_flicker, ultrasonic), and functionally equivalent challenge families that provide comparable spoof resistance.

Consistency rule library. Deployments MAY register named rules (e.g., vel_bound, alt_bound, rf_tof) for audit; thresholds are illustrative. Rule names are advisory; gate semantics remain at the Ingress Gate.

Contract & Badge Templates (Communication-Only; Non-Binding)

Conformance badge language. "Passing Appx. L vectors at profile TSIL-Core or better qualifies for 'TSIL-Ready' badge." Badges are evidence-only; do not alter gate semantics.

RFP phrases. "Vendor SHALL support receipt-gated sensor ingress with signed-head freshness and append-only evolution (consistency) validation; missing proofs MUST result in Structured Precondition-Failure (code) or HOLD per profile."

APPENDICES (ILLUSTRATIVE;
NON-LIMITING)

Appendix A—Glossary

[A001] Sensor Receipt (S2). Per-event receipt: boundary_measurement, input_digest, monotonic_counter, trusted_event_time, anti_replay; signed & anchored.

[A002] Ingress Gate. OS/HAL surface that admits/denies sensor events; fail-closed.

[A003] Liveness Challenge. Active stimulus (flicker/IR/ultrasonic) and verification to detect replay/spoof.

[A004] Multi-Sensor Consistency. Cross-modal plausibility checks (e.g., GPS-IMU-barometer-camera).

[A005] Sensor-Permit. Scope-bound, TTL-limited, single-use permission bound to S2/Scope digests.

[A006] Certification Result. Signed verifier decision committing to receipt/head identifiers; evidentiary.

[A007] EvidenceBundle. Signed package of proofs/heads/cert refs for audit.

[A008] Latency Budget. Implementation-defined time bound for admission; overrun→fail-closed.

[A009] Freshness Policy/MMD. Maximum head age/merge delay; stale→deny/HOLD.

[A010] Append-only evolution (consistency). Proof that current head descends from prior head under an append-only invariant.

[A011] Signed Head. A cryptographically signed commitment to the current log state (tree/set/functional equivalent).

[A012] Continuity Record. A record linking successive signed heads observed during validation.

[A013] Attested Transport. Transport bound to attestation evidence (e.g., mTLS+TEE report); acceptance MAY require a match.

[A014] Short-Permit (HOLD). A restricted, time-limited permit issued while quorum/continuity completes; non-dispositive for settlement/critical actuation.

[A015] Sensor Integrity Score. An evidentiary score computed over validated streams; non-dispositive for admission.

[A016] Calibration Certificate. Proof a sensor meets calibration requirements; evidence-only (e.g., factory/field/self).

[A017] Sensor Health Status. A GOOD|DEGRADED|FAIL status object for bias/noise/drift; evidence-only.

[A018] Sensor-Permit Status. OCSP-style status for permits (GOOD|REVOKED|EXPIRED|UNKNOWN); evidence-only.

[A019] Quorum (k-of-m)/Dual-Anchor. Agreement policy across multiple logs; dual-anchor is k=2, m=2.

[A020] Tenant/Namespace. An identifier used to isolate tokens/receipts/settlement state; functionally equivalent partitioning is in scope.

[A021] Policy Pack/Control ID. Audit-only labels (e.g., "ISO27001-A.12", "GDPR-A32") carried by artifacts; non-dispositive.

[A022] Evidence Map. Mapping from control_id to evidence_refs[ ] (proof/log entries) for audits; evidence-only.

[A023] Risk Score/KPIs. Optional model-free risk (0 . . . 1) and ops KPIs (e.g., ttd_ms, mttr_ms); evidence-only.

[A024] VRR. Variable Refresh Rate; timing policy for variable display/sensor cadence; numbers illustrative.

[A025] ISR. Interrupt Service Routine; admission slices should respect ISR/worker deadlines.

[A026] HAL. Hardware Abstraction Layer; OS sensor interface layer where an ingress gate may be enforced.

[A027] DAG. Directed Acyclic Graph; used for multi-sensor consistency graphs.

[A028] ToF. Time-of-Flight; RF/GNSS/optical timing used in consistency proofs.

[A029] Structured Precondition-Failure (code). A machine-readable denial comprising a canonical code and context (optional remediation hints). Presence of context is evidentiary only and does not alter gate semantics.

[A030] Virtual Sensor. A sensor abstraction or fused stream whose events are admitted on a read/subscribe path; treated equivalently to a physical sensor for TSIL admission.

[A031] Status Stapling. Inclusion of a fresh permit-status response alongside an admission decision; evidentiary only.

[A032] Public log (equivalence; illustrative). "Public log" includes certificate-transparency-style append-only logs that publish signed tree/set heads, and functionally equivalent accumulator or vector-commitment heads providing signed-head freshness and append-only evolution (consistency) proofs (illustrative; non-limiting).

[A033] URC (Universal Provenance & Use-Condition Layer (UPL)) (illustrative; evidence-only). Use Receipt Core for verify-then-write memory/caches; referenced for audit-only cross-rail evidence.

[A034] MLR (Attested Model Loader & AI-SBOM Gate (AML-Gate)) (illustrative; evidence-only). Model-Load Receipt bound to loader admission; audit-only reference.

[A035] PT (Trusted Human Presence (THP)) (illustrative; evidence-only). Session-bound Presence Token (HUMAN/AUTHORIZED_CLONE/UNDETERMINED) used in RTC contexts; audit-only reference.

[A036] VC/VP (W3C) (illustrative; evidence-only). Verifiable Credential/Presentation formats (LD-JSON or SD-JWT) referenced for audit export; gates unchanged.

[A037] C2PA Manifest (illustrative; evidence-only). Content-credential/claim-signature reference for capture provenance; evidence-only.

[A038] Platform attestation (illustrative; evidence-only). Evidence such as Verified Boot/VBMeta digests and roll-back posture, or Secure Enclave OS-bound keys/LocalPolicy; inputs to channel-binding decisions; evidence-only.

[A039] Snapshot Freshness Policy. A policy under which a validator accepts a monotonic snapshot identifier (snapshot_id) issued by a transparency service and validates monotonic advancement within a policy window as an alternative to an append-only evolution (consistency) proof.

[A040] Transport Exporter. An evidentiary descriptor of the egress/ingress channel (e.g., session/link/bus binding or exporter value) used to detect downgrade/MITM; acceptance MAY require a match; evidence-only.

[A041] Stream Parameters. Expected per-stream signal parameters (e.g., width_px, height_px, encoding, fps, ts_rate_hz) recorded for audit; evidence-only.

[A042] Parameter Commitment. A cryptographic digest of expected stream parameters used to detect IP-stream injection or replay/relay; evidence-only.

[A043] Time Sanity Reference (time_sanity_ref). An audit reference indicating corroboration across independent time sources (TEE monotonic, OS/network time, policy epoch, head_ts) within a freshness window; evidence-only.

[A044] Display Binding (display_binding). An audit crumb binding a permitted frame to presentation artifacts (e.g., panel_id_hash, present_fence_id); evidence-only.

[A045] Anomaly Flags (anomaly_flags). Advisory labels such as RELAY_SUSPECTED, DEEPFAKE_SUSPECTED, ADVERSARIAL_PATCH, AUTO_EXPOSURE_JAMMED used for SOC correlation; evidence-only.

[A046] Head Age (head_age_ms). Elapsed time since the current signed head was observed locally; values over policy thresholds map to STALE_HEAD.

[A047] Decision Slice Watchdog. A scheduler guard that bounds the ingress decision computation slice; overruns map to TIME_BUDGET_EXCEEDED.

[A048] Head Continuity Index. An index or chain linking successive signed heads to accelerate audits; evidence-only.

[A049] Evidence-Only. A field or artifact consumed for audit/observability and RFP/compliance that does not alter TSIL gate predicates or admission/deny semantics.

[A050] PASS/HOLD/FAIL. Symbolic admission outcomes: PASS admits (optionally mints a permit); HOLD withholds or restricts (e.g., Short-Permit) pending continuity/quorum; FAIL drops the event.

[A051] Snapshot Identifier (snapshot_id). A monotonic identifier issued by a transparency service under a snapshot-freshness policy; allows monotonic advancement checks as an alternative to an append-only evolution proof (policy-bound).

[A052] Public/Consortium/Private Log. An append-only log operated in public, federated, or private mode that publishes signed heads and exposes inclusion and append-only evolution (consistency) proofs under a freshness policy; functional equivalents are in scope (see Appendix H).

[A053] Multi-GNSS Cross-Check. Cross-system corroboration of GNSS fixes; disagreement⇒GNSS_CROSS-CHECK_FAIL.

[A054] AoA Profile. Angle-of-arrival/TDoA summary for spatial consistency checks (RF/mic arrays).

[A055] RIR Profile. Room-impulse-response reference for acoustic provenance; evidence-only.

[A056] Replay Attack. Re-recording or retransmission to masquerade prior sensor output (e.g., audio/camera/RTSP).

[A057] MEMS Drift (ppm). Audit field reporting oscillator drift; evidence-only.

[A058] GPS Firewall Reference. Anti-spoof filtering appliance reference; evidence-only.

[A059] Equal Error Rate (EER). Crossover point of FAR/FRR used in PAD tuning; report-only.

[A060] RTSP Session Nonce. Per-session unique value used to detect camera stream replay; evidence-only.

[A061] Neural Sensor Fabric. A fabric that couples sensors and neural/ML processing tightly on-device; treated as an admission surface if gating occurs before subscriber visibility. (Illustrative.)

[A062] Accelerator DMA Queue/Fence. A queue or fence controlling sensor data ingress to an accelerator; treated as an admission surface when gating precedes subscriber visibility. (Illustrative.)

[A063] RTOS/Firmware Driver Commit. A commit point in an RTOS/firmware driver path at which sensor data becomes readable; treated as an admission surface when gating precedes subscriber visibility. (Illustrative.)

[A064] World Anchor (illustrative; evidence-only). A spatial reference used by XR systems; may be bound to an S2/admission event for audit; does not alter gate semantics.

[A065] Occlusion Mesh (illustrative; evidence-only). A mesh describing occlusion planes for composition; may be referenced for audit; does not alter gate semantics.

[A066] Read/Subscribe Path (illustrative; evidence-only). A functionally equivalent path by which events become readable by subscribers; includes OS/HAL bus submit/commit, firmware/RTOS driver commits, accelerator DMA queues/fences, virtualization shims, network offload devices (SmartNICs/DPUs), ISP/encoder pipelines, FPGA/ASIC bridges, and gateway/proxy bridges, provided gating occurs before subscriber visibility. Names are illustrative; function controls.

[A067] Reality Receipt ($R^2$) (illustrative; evidence-only).

A frame/overlay-level receipt issued by the Trusted Reality Compositor (TRC). The r2_refs field in a TSIL EvidenceBundle MAY reference one or more $R^2$ objects to enable chain-of-custody (capture→overlay). Such references are evidence-only and do not alter TSIL gate predicates; the claims control.

[A068] Cross-rail Reference (illustrative; evidence-only).

A reference that links evidence across rails (e.g., TSIL S2↔TRC $R^2$) to produce portable, verifiable chain-of-custody records. Cross-rail references are evidence-only and do not affect the admission/decision predicates of either rail.

[A069] PET (Permit Evidence Tuple)—A signed, canonical tuple carried by UPTX's permit-carrying transport; fields align with NOVACOV evidence objects (e.g., permit_id, signed_head_id, quorum_sigs, freshness/MMD, nonce, monotonic, audience). PET MAY carry a digest or reference to TSIL evidence; evidentiary only.

[A070] TETpay (Transaction Evidence Tuple)—A signed tuple carried by PAYGATE; the KDF context MAY include a canonicalized TETpay and, optionally, a receipt_core_digest derived from TSIL evidence; evidentiary only.

[A071] Jurisdictional Fingerprint—An evidentiary region/sovereign label optionally carried by external rails (NOVACOV/UPTX/PAYGATE) and MAY be mirrored in TSIL EvidenceBundles for audit continuity; non-dispositive for admission semantics.

[A072] Safety Risk Budget Engine (SRBE-Rail). An external, multi-harm risk budgeting and evidence engine that aggregates harm-specific signals across AI safety episodes, applies per-episode risk budgets, and emits Safety Evidence Receipts anchored in a tamper-evident ledger. TSIL MAY provide sensor-level evidence (e.g., S2 digests or EvidenceBundles) to SRBE-Rail™ as evidentiary inputs; such cross-rail usage is evidence-only and does not alter TSIL ingress gate semantics.

[A073] Age-Assurance Artefact/Age Token (A-TOKEN). A cryptographically verifiable token or credential bound to a device and/or profile that encodes at least an age tier (for example, "under 13", "13-15", "16-17", or "18+") and optionally an assurance confidence level. Such artefacts MAY be produced by a trusted sensor or device-OS layer and consumed as input signals by policy rails (for example, Kids AI Companion Safety Rail (K-ACSR)) or context envelopes, and MAY be carried via S2-EXT or functionally equivalent extensions. Age-assurance artefacts are evidentiary only and do not alter TSIL gate predicates or admission semantics; the claims control.

Appendix B—Schemas (Illustrative; Non-Limiting)

Notes. JSON fields beyond the core are evidence-only and non-dispositive for admission/deny semantics. Encodings are functionally equivalent (e.g., JCS JSON, canonical CBOR); parsers SHOULD ignore unknown fields.

[B1] S2 (v1.2)
{
  "type": "SensorReceipt",
  "version": "1.2",
  "capabilities": ["mav","quorum","zk","liveness","consistency","pad","mfa","edge"],
  "canon": {"format": "JCS", "hash_alg": "sha256"},
  "tenant_id": "tnt:...",
  "boundary_measurement": "...",
  "input_digest": "sha256:...",
  "monotonic_counter": 123456,
  "trusted_event time": "2025-09-13T12:00:00Z",
  "anti_replay": {"nonce": "...", "policy_epoch": "...", "profile_id": "..."},
  "anchor": {"log_id": "log:...", "head_id": "sth:..."},
  "proofs": {
    "inclusion": "...",
    "append_only_evolution":"...",
    "freshness_policy": {"mmd_s": 600},
    "proof_profile": "TSIL-Core/1.0"
  },
  "continuity": { "prev_head_id": "sth:...", "chain": ["sth:...", "sth:..."]},
  "liveness": { "challenge": "ir_flicker", "verdict": "PASS"},
  "consistency": { "graph_ref": "dag:...", "verdict": "PASS"},
  "agent": {"agent_id": "agt:...", "agent_version": "..."},
  "data_classification": ["PII", "PHI"],
  "regulatory_tags": ["GDPR-art30"],
  "dpia_ref": "dpia:...",
  "zk": [{"statement": "in_zone:US-CA", "proof_ref": "prf:...", "verdict": "PASS"}],
  "transport_exporter": "exp:...",
  "c2pa_manifest_ref": "urn:c2pa:...",
  "vc_status_ref": "https://.../credential/status/...",
  "gnss": { "systems": ["GPS", "Galileo"], "crosscheck": "PASS" },
  "aoa_profile": "aoa:...",
  "active_challenge": {
    "kind": "optical|acoustic",
    "token_id": "tok:...",
    "nonce": "...",
    "rtt_ms": 37
  },
  "array_geometry": "arr:...",
  "tdoa_profile": "tdoa:...",
  "rir_ref": "rir:...",
  "stream_params": {
    "width_px": 1936,
    "height_px": 1216,
    "encoding": "BayerRG8",
    "fps": 20,
    "ts_rate_hz": 20
  },
  "transport_params": {
    "width_px": 1936,
    "height_px": 1216,
    "encoding": "BayerRG8",
    "fps": 20,
    "block_id_delta": 1,
    "ts_rate_hz": 20
  },
  "param_commitment": "sha256:...",
  "latency_observed_ms": 42,
  "mems_drift_ppm": 0.7,
  "anomaly_flags":
["DEEPFAKE_SUSPECTED", "RELAY_SUSPECTED", "ADVERSARIAL_PATCH"],
  "rtsp_session_nonce": "rtsp:...",
  "frame_counter": 123456,
  "world_anchor_ref": "xra:...",
  "occlusion_mesh_ref": "xro:...",
  "thp_pt_ref": "thp:pt:...",
  "thp_state":
"HUMAN|AUTHORIZED_CLONE|UNDETERMINED|EXPIRED|DOWNGRADE_
DETECTED",
  "signature": "sig:...",
  "ext": { }
}

[B1N] Notes (evidence-only; non-dispositive)
active_challenge, stream_params, transport_params, param_commitment, latency_observed_ms, and anomaly_flags are optional and evidence-only; they do not alter TSIL ingress gate semantics. They aid auditors/SOC in detecting relay/re-feed, screen-replay, IP-stream injection (full/stripe/patch), and AI-synthesized audio/voice while the HAL gate remains unchanged.

The fields transport_exporter, c2pa_manifest_ref, vc_status_ref, thp_pt_ref, and thp_state are optional, evidence-only cross-rail pointers; gates unchanged.

Other optional fields (e.g., tenant_id, agent, data_classi-fication, regulatory_tags, dpia_ref, zk, continuity-.chain) are evidentiary and must not affect admission/deny decisions.

capabilities is advisory (reporting only). canon specifies the deterministic encoding for digests/signatures.

Parsers SHOULD ignore unknown fields; ext is reserved for forward compatibility.

Version 1.2 reflects optional audit/export additions only; core semantics (anchoring, inclusion, append-only evo-lution (consistency), anti-replay) are unchanged.

gnss, aoa_profile, array_geometry, tdoa_profile, rir_ref, mems_drift_ppm, rtsp_session_nonce, and frame_counter are optional and evidence-only; they do not alter TSIL ingress gate semantics. They support multi-GNSS cross-checks, AoA/TDoA spatial liveness, acoustic provenance, timing sanity, and camera replay auditing (e.g., RTSP), enabling auditors and SOC teams to detect spoof/replay conditions while the HAL gate remains unchanged.

world_anchor_ref and occlusion_mesh_ref are optional, evidence-only and do not alter TSIL gate semantics.

Cross-rail refs MAY include {r2_ref, popc_receipt_ref, novacov_permit_id, uptx_pet_hash, paygate_tetpay_hash}; these are evidence-only and MUST NOT alter TSIL gate semantics. Parsers SHOULD ignore unknown fields.

array_geometry, tdoa_profile, and rir_ref are optional, evidence-only audit fields related to spatial-audio live-ness; they do not alter TSIL gate semantics.

```
[B2] Certification Result (v1.2)
{
    "type":"CertificationResult",
    "version":"1.2",
    "profile":"TSIL-Core/1.0",
    "status": "PASS|HOLD|FAIL|STALE|REVOKED",
    "codes":["..."],
    "receipt_id":"s2:...",
    "head_ids":["sth:...", "sth:..."],
    "quorum": {"required":"k-of-m","k":2,"m":3,"verifiers":["did:v1","did:v2","did:v3"] },
    "continuity":{ "prev_head_id":"sth:...","chain":["sth:..."]},
    "verifier_id":"did:...",
    "issued at": "2025-09-13T12:01:00Z",
    "decision_latency_ms":7,
    "proofs_summary": {"inclusion":"PASS", "append_only_evolution": "PASS"},
    "policy_pack_id":"pol:...",                  // audit-only
    "control_ids":["ISO27001-A.12", "GDPR-A32"], // audit-only
    "risk_score":0.18,                  // model-free 0..1
    "kpis":{"ttd_ms":800,"mttr_ms":600},        // evidence-only
    "siem_event_ref":"siem:...",               // observability only
    "itsm_ticket_id":"it: INC-12345",
    "signature":"sig:...",
    "ext": { }
}
[B3] Sensor-Permit (v1.1)
{
    "type":"SensorPermit",
    "version":"1.1",
    "permit_id":"perm:...",
    "aud":"did:rp:...",
    "scope_digest":"sha256:...
    "s2_digest":"sha256 .... ",
    "nbf":"2025-09-13T12:01:00Z",
    "exp":"2025-09-13T12:01:30Z",
    "ttl_s":30,
    "single_use":true,
    "replay_window_s":0,              // strict single-use (illustrative)
    "permitted_ops":["read","forward"],    // optional
    "resource":["sensor:camera/*"],        // optional selector
    "status_ref":"https://.../permit/status/perm:...",
    "delegation":{"parent_permit_id":"perm:parent:...","strict_subset":true},
    "signature"sig:...",
    "ext": { }
}
[B4] Precondition Failure (v1.2)
{
    "type": "PreconditionFailure",
    "version":"1.2",
    "decision_id":"dec:...",
    "surface":"hal|driver|bus|api",
    "status":"FAIL|HOLD",
"code":"POLICY_DENIED|PROOF_REQUIRED|TIME_BUDGET_EXCEEDED|STALE_HE
AD|CONSISTENCY_FAIL|SPOOF_DETECTED|PERMIT_REPLAY|HEAD_CONFLICTRA
TE_LIMIT|ADMISSION_BUSY",
    "reason":"...",
    "messages":{"en-US":"...","ko-KR":"..."}, // i18n (optional)
    "severity":"info|warn|error|critical",
    "transient":true,
    "context":{
        "missing_proof":["inclusion"],
        "overrun_ms":3,
```

```
    "head_age_ms":480,
    "token_id":"perm:...",
    "idempotency_key":"idem:...",
    "correlation_id":"corr:..."
    "retry_after_ms":200
  },
  "remediation": ["refresh_head", "request_quorum", "retry_later"],
  "policy_pack_id":"pol:...",
  "control_ids":["ISO27001-A.12"],
  "siem_event_ref":"siem:...",
  "itsm_ticket_id":"it: INC-12345",
  "deny_signature":"sig:...",
  "issued_at":"2025-09-13T12:01:09Z",
  "ext": { }
}
```

[B5] EvidenceBundle (v1.1)

```
{
  "type":"EvidenceBundle",
  "version":"1.1",
  "bundle id":"evb:...",
  "receipt_id":"s2:...",
  "r2_refs": ["r2:..."],
  "receipt_core_digest":"sha256:...",
  "head_ids":["sth:..."],
  "continuity_chain":["sth:...", "sth:..."],
  "proof_refs":["prf:inc:...","prf:evo:..."],
  "cert_result_ref":"cert:...",
  "policy_pack_id":"pol:...",
  "control_ids":["GDPR-A32"],
  "exported_at":"2025-09-13T12:02:00Z",
  "signature":"sig:...",
  "ext": { }
}
```

[B5N] r2_refs, novacov_permit_id, uptx_pet_hash, and paygate_tetpay_hash are an optional cross-rail reference (to TRC Reality Receipts). It is evidence-only and does not alter TSIL gate semantics.

[B6] CalibrationCertificate v1.0

```
{
  "type":"CalibrationCertificate",
  "version":"1.0",
  "sensor_id":"sns:...",
  "calibration_profile":"factory|field|self",
  "calibrated at":"2025-09-01T00:00:00Z",
  "valid until":"2026-09-01T00:00:00Z",
  "evidence_refs":["log:...","doc:..."],
  "signature":"sig:...",
  "ext":{ }
}
```

[B7] SensorHealthStatus v1.0

```
{
  "type": "SensorHealthStatus",
  "version":"1.0",
  "sensor_id":"sns:..."
  "status":"GOOD|DEGRADED|FAIL",
  "last_check":"2025-09-13T12:03:00Z",
  "reason":"bias_drift|noisy|offline|n/a",
  "signature":"sig:...",
  "ext":{ }
}
```

[B8] SensorPermitStatus v1.0

```
{
  "type":"SensorPermitStatus",
  "version":"1.0",
  "permit_id"perm:...",
  "status":"GOOD|REVOKED|EXPIRED|UNKNOWN",
  "reason":"revoked_by_policy|expired|n/a",
  "last_checked":"2025-09-13T12:04:10Z",
  "next_update":"2025-09-13T12:09:10Z",
  "signature":"sig:...",
  "ext":{ }
}
```

[B9] GateHealthReceipt (v1.0)—illustrative; evidence-only

Purpose. A signed, independently verifiable health/status receipt emitted by an ingress gate or verifier to report posture and cache freshness. Consumers (e.g., SIEM/SOAR, safety controllers) SHOULD prefer GateHealthReceipt over unauthenticated UI/strings to mitigate spoofed security alerting (fake "healthy" indicators). (Illustrative; non-limiting.)

Verification (illustrative). Verify signature→(optionally) verify anchor to a signed head/continuity→enforce a freshness policy window (e.g., MMD) for issued_at and cache ages→accept only from allowed gate_id/verifier_id. (Illustrative; non-limiting.)

Mapping. Designed to be logged as Application Log Content and correlated in SIEM alongside deny codes and latency metrics. (Evidence-only.)

```
{
    "type": "GateHealthReceipt",
    "version": "1.0",
    "gate_id": "did:gate:...",              // logical or hardware gate identifier
    "verifier_id": "did:verifier:...",      // if emitted by a verifier
    "profile": "TSIL-Core|TSIL-Pro|TSIL-Auto",
    "policy": {
        "mmd_s": 86400,                     // illustrative; freshness window
        "latency_budget_ms": 5              // illustrative; admission slice budget
    },
    "posture": {
        "window_s": 300,                    // measurement interval
        "pass_rate": 0.982,                 // fraction of PASS in window
        "hold_rate": 0.016,                 // fraction of HOLD in window
        "fail_rate": 0.002,                 // fraction of FAIL in window
        "deny_code_breakdown": {            // evidentiary counts (subset)
            "STALE_HEAD": 7,
            "TIME_BUDGET_EXCEEDED": 3,
            "SPOOF_DETECTED": 2,
            "CONSISTENCY_FAIL": 1
        },
        "mean_decision_latency_ms": 1.8,
        "p99_decision_latency_ms": 4.7
    },
    "head_cache": {
        "last_head_id": "sth:...",
        "head_cache_age_ms": 420,           // age of cached signed head
        "head_cache_ttl_ms": 2000,          // illustrative
        "continuity_depth": 3,              // number of heads chained in window
        "quorum": { "k": 2, "m": 3, "diversity_ok": true } // if Pro/quorum
    },
    "stapling": {
        "decision_ids": ["dec:...", "dec:..."], // optional: stapled to recent decisions
        "expires_at": "2025-09-13T12:05:00Z" // receipt freshness bound
    },
    "observability": {
        "siem_event_ref": "siem:...",       // evidence-only
        "soar_playbook_ref": "soar:...",    // evidence-only
        "audit_refs": ["audit:entra:..."]   // e.g., identity/audit linkage (evidence-only)
    },
    "issued_at": "2025-09-13T12:04:10Z",
    "anchor": {                             // optional anchoring to a log
        "log_id": "log:...",
        "head_id": "sth:...",
        "continuity": ["sth:...", "sth:..."]  // optional chain for continuity
    },
    "signature": "sig:...",
    "ext": { }
}
```

Notes (evidence-only; non-dispositive).

posture summarizes recent sensor health/host-status signals and deny taxonomy for correlation; consumers SHOULD compare against centralized telemetry to detect spoofed local notifications.

Emit/ingest as Application Log Content and integrate with SIEM for correlation and alerting; fields above are illustrative and MAY be extended without breaking parsers.

This artifact does not alter gate semantics (admission/deny); it is consumed as proof of posture/freshness only. (Evidence-only.)

[B10] LivenessReceipt (v1.0)—illustrative; evidence-only

Purpose. A signed, independently verifiable receipt asserting the outcome of a liveness (anti-spoof) check. It captures how liveness was satisfied (active, passive, hybrid), what signals/models were used, PAD metrics (APCER/BPCER/ACER/EER), and generalization protocol (within vs. cross-dataset), so SIEM/RFP reviewers can trust results without raw bio-metric exposure. (Illustrative; non-limiting.)

Verification (illustrative). Verify signature→(optionally) verify anchor to a signed head/continuity→enforce fresh-ness window (e.g., MMD) for issued_at→accept only from allowed gate_id/verifier_id. (Illustrative; non-limiting.)

```
{
    "type": "LivenessReceipt",
    "version": "1.0",
    "receipt_id": "liv:...",
    "gate_id": "did:gate:...",
    "verifier_id": "did:verifier:...",
    "profile": "TSIL-FaceKYC|TSIL-Core|...",
    "method": "active/passive|hybrid",
    "challenge_class": "ir_flicker|blink|head_turn|phrase|n/a",
    "signals": ["texture","depth","micro_motion","bloodflow_proxy","voice_formants"],
    "capture": {
        "modality": ["RGB","IR","depth","structured_light","hyperspectral"],
        "device_class": "camera|mic|xr_headset|kiosk",
        "sample_duration_ms": 1200,
        "frame_rate_fps": 30,
        "illumination": ["ambient","IR","structured_light"]
    },
    "model": {
        "model_id": "ml:...",
        "model_hash": "sha256:...",
        "model_class": "cnn|transformer|gnn|hybrid",
        "vendor_cert": ["ISO/IEC 30107-3 PAD L1|L2","iBeta"],
        "inference_latency_ms": 18.4
    },
    "verdict": "PASS|FAIL",
    "confidence": 0.997,
    "deny_code": "SPOOF_DETECTED|LIVENESS_REQUIRED|n/a",
    "failure_details": {
        "spoof_type": "photo|video|3d_mask|deepfake|replay|unknown",
        "features_triggered": ["eye_parallax_mismatch","texture_anomaly"],
        "threshold": "eer|min_acer|custom"
    },
    "pad_metrics": {
        "apcer": 0.003,
        "bpcer": 0.000,
        "acer": 0.002,
        "eer": 0.000
    },
    "validation": {
        "validation_protocol": "within|cross|combined",
        "dataset_refs": ["3DMAD","CSMAD","MSSpoof","Replay-Attack"],
        "notes": "threshold fixed on source set; evaluated zero-shot on target sets"
    },
    "policy_context": {
        "required_by_policy": true,
        "mfa_required": false
    },
    "observability": {
        "siem_event_ref": "siem:...",
        "soar_playbook_ref": "soar:...",
        "audit_refs": ["audit:..."]
    },
    "issued_at": "2025-09-13T12:04:10Z",
    "anchor": {
        "log_id": "log:...",
        "head_id": "sth:...",
        "continuity": ["sth:...", "sth:..."]
    },
    "signature": "sig:...",
    "ext": { }
}
```

Notes (evidence-only; non-dispositive).

pad_metrics follow biometric PAD terminology (APCER, BPCER, ACER, EER); thresholds may be set at EER or minimum ACER on a development split. This allows auditors to compare vendors without affecting gate semantics.

validation. validation_protocol makes within vs. cross-dataset performance explicit; cross-dataset often degrades unless models are combined/regularized-cap-turing that provenance here improves trust.

modality/illumination enumerate contemporary anti-spoof techniques (IR/structured light/3D; hyperspec-tral) and on-device/edge patterns used in 2025 deploy-ments-purely descriptive.

This artifact does not alter admission semantics; it's consumed as audit/RFP evidence and "application-log content" by SIEM. (Evidence-only.)

[B11] S2-EXT (Sensor Receipt Governance/Evidence Extensions, v1.2)
(illustrative; evidence-only; transport is functionally equivalent)

```
{
    "type": "S2-EXT/1.2",
    "s2_ref": "s2:abc",
    "profile_id": "TSIL-Kids",
    "connectivity_class": "offline",
    "local_anchor_policy": "hybrid",
    "guardian_consent_ref": "https://example.org/consent/abc",
    "zk_age_class": "sha256: AGEPROOF...",
    "schema_refs": ["https://example.org/schemas/tsil/s2-ext/1.2"],
    "ext": { }
}
```

Notes (kept in prose, not JSON):

profile_id may be TSIL-Kids|TSIL-Community|TSIL-Core connectivity_class may be offline|intermittent|online local_anchor_policy may be local_only|hybrid|public_only All keys are optional and evidence-only for audit/procurement; gate semantics are unchanged.

In a child-profile or "TSIL-Kids" deployment, S2-EXT MAY bind a guardian consent reference and an age-class attribute (optionally backed by a zero-knowledge age-verification credential) into the context envelope, and missing or invalid evidence MAY map to CHILD_CONSENT_REQUIRED or AGE_SCOPE_FAIL deny codes. (Illustrative; non-limiting; evidence-only.)

[B12] S2-MED v1.0 - illustrative; evidence-only

```
{
    "type": "SensorReceipt",
    "version": "1.0",
    "profile": "TSIL-Med/1.0",
    "study uid": "1.2.840.....",
    "series uid": "1.2.840.....",
    "sop_instance_uid": "1.2.840.....",
    "pacs_anchor": { "store_id": "pacs:...", "object_hash": "sha256:..." },
    "ai model id": "ml:...",        // audit-only
    "ai model hash": "sha256:...",    // audit-only
    "signature": "sig:...",
    "ext": { }
}
```

Notes: audit-only fields MUST NOT alter PASS/HOLD/FAIL gate semantics; unknown fields SHOULD NOT break parsers.

Appendix C—Profiles (Illustrative; Non-Limiting)

[C1] TSIL-Core. S2+freshness (inclusion+evolution)+single-log; fail-closed admission.

[C2] TSIL-Pro. Core+k-of-m quorum; continuity emission; optional attested transport.

[C3] TSIL-Privacy. Core+ZK predicates; redacted auditor views.

[C4] TSIL-Auto (vehicle/XR). Core+liveness (camera/IR), consistency (GPS-IMU-barometer), stricter budgets.

[C5] TSIL-Edge-Lite. Core+Short-Permit for intermittent links; auto-expiry.

[C6] TSIL-Enterprise/Gov (illustrative). Pro+calibration validity+health status+governance exports; numerics illustrative.

[C7] TSIL-CAN (automotive/industrial). Core semantics with CAN timing budgets; ingress before subscriber visibility at driver/bus surfaces; compatible with security gateways/IDS and bus-guardian hardware; resilient to flood/contradiction scenarios; illustrative threats include arbitration floods, error-passive spoofing and double-receive behaviors; numbers illustrative. (Illustrative; non-limiting.)

[C8] TSIL-FaceKYC. Core gating+liveness (active and/or passive per regulator), deny taxonomy for replay/mask/deepfake, optional ZK ("age≥18/in_zone") for privacy, LivenessReceipt export, EvidenceBundle logged as "application log" content for SIEM. (Illustrative; non-limiting.)

[C9] TSIL-KYC (Face/Voice). Core gating+liveness for face and voice; optional MFA policy requiring both; deny taxonomy covers replay/mask/voice deepfake; optional ZK ("age≥18/in_zone") and LivenessReceipt export. (Illustrative; non-limiting.)

[C10] TSIL-Kids (advisory).

Core+strict status-stapling recency≤MMD, Short-Permit (HOLD) in offline/edge, optional guardian-consent evidence for capture; Liveness required for face/voice contexts. Advisory; audit-only; gate predicates unchanged.

In some embodiments, a TSIL-Kids profile uses S2-EXT to carry guardian consent references and age-class attributes for child profiles; absence or invalidity of such evidence MAY map to CHILD_CONSENT_REQUIRED or AGE_SCOPE_FAIL per policy. (Illustrative; audit-only; gate predicates unchanged.)

[C11] TSIL-Community (Underserved; advisory).

Core+snapshot freshness, Short-Permit (HOLD), offline roll-up with later anchoring, reduced TTL/recency for low-resource endpoints. Advisory; audit-only; gate predicates unchanged.

(Profiles/tier names are communication tools; functionally equivalent bundles are in scope.)

[C12] TSIL-Med (illustrative; non-limiting).

Core rail semantics with S2-MED mapping, optional dual-anchor (log head+PACS object hash), CalibrationCertificate required by policy, and regulator-grade EvidenceBundle export for audit/insurer use. Model attestation MAY be required for AI triage. Evidence-only; gate semantics unchanged.

Appendix D—Deny Codes (Non-Exhaustive; Machine-Readable)

POLICY_DENIED, PROOF_REQUIRED, TIME_BUDGET_EXCEEDED, STALE_HEAD, CONSISTENCY_FAIL, SPOOF_DETECTED, PERMIT_REPLAY, QUORUM_UNAVAILABLE, PERMIT_EXPIRED, LIVENESS_REQUIRED, CALIBRATION_EXPIRED, SENSOR_HEALTH_FAIL, HEAD_CONFLICT, RATE_LIMIT, ADMISSION_BUSY, PRIVACY_PROOF_REQUIRED, PRIVACY_PROOF_FAIL, PLATFORM_ATTEST_FAIL, OFFLINE_EXPIRED, FRAME_INJECTION, GNSS_CROSSCHECK_FAIL (multi-GNSS disagreement), AOA_MISMATCH (AoA/TDoA spatial conflict), REPLAY_DETECTED and RTSP_REPLAY (camera/audio replay).

FRAME INJECTION—IP-stream full/stripe/patch packets altered; mapped from width/param mismatches or param-commitment violations (report-first; still evidence-only).

AUTO_EXPOSURE_JAMMED—camera blinded or auto-controls confused (e.g., IR/laser dazzle bursts); evidence flag for SOC correlation.

CONSISTENCY_REQUIRED—Synonymous evidence label used by external rails for a missing/unsatisfied consistency proof; maps to TSIL CONSISTENCY_FAIL for client interoperability. Unknown codes SHOULD NOT break clients.

STATUS_STALE—stapled status exceeds recency≤MMD→ HOLD/FAIL per profile

EVIDENCE_EXPIRED—stapled evidence expired→ HOLD/FAIL per profile

CHILD_CONSENT_REQUIRED—missing/invalid guardian consent evidence→HOLD/FAIL per policy AGE SCOPE_FAIL—requested capture outside zk_age_class/policy→FAIL MODEL ATTEST_FAIL—model identity/version proof missing or mismatched for triage.

PACS ANCHOR MISMATCH—PACS object hash diverges from S2/log anchor.

Notes.

Codes are machine-readable strings; unknown codes SHOULD NOT break clients.

Vendors MAY extend using namespaced forms (vnd.<org>.<code>).

Deny codes are evidence only; policy decides mapping of conditions to codes.

Appendix E—Conformance & Certification (Illustrative; Non-Limiting)

[E0] Profiles (illustrative; evidence-only).

TSIL-Core: single-log freshness (inclusion+append-only evolution).

TSIL-Pro: Core+k-of-m quorum and continuity chain export.

TSIL-Privacy: Core+ZK/MPC predicate support with redacted auditor views.

TSIL-Auto: Core/Pro+active liveness (camera/IR) and GNSS-IMU consistency; stricter budgets.

TSIL-XR/Enterprise: Core/Pro+calibration/health evidence export; SIEM mapping.

Profiles are certification aids for RFPs; they do not alter gate semantics.

[E1] Conformance Manifest (reference; evidence-only).

A deployment MAY publish a signed JSON/YAML manifest for audit/RFP only; absence is non-dispositive for gate semantics.

```
[E2] TSIL-ConformanceManifest
{
    "type": "TSIL-ConformanceManifest",
    "version": "1.0",
    "profile": "TSIL-Core|TSIL-Pro|TSIL-Privacy|TSIL-Auto|TSIL-Edge-Lite",
    "sensor_profiles": ["TSIL-Auto/1.0", "TSIL-Edge-Lite/1.0"],
    "capabilities": [
        "mav","quorum","zk","liveness","consistency",
        "edge_lite","sensor_permit_status","calibration_required","health_monitor",
        "transport_exporter","vc_export","c2pa_ingest","thp_presence_ref"
    ],
    "multi_gnss": {"enabled": true, "systems":["GPS","Galileo","GLONASS","BeiDou"]},
    "aoa": {"enabled": true, "rf": true, "mic": true},
    "rir_profile": true,
    "array_spatial_liveness": true
    "freshness_policy": { "mmd_s": 600, "max_head_age_s": 900 },
    "proof_suites": ["merkle-tree", "vector-commitment"],
    "quorum": { "enabled": true, "k": 2, "m": 3, "diversity": ["org","geo","impl"] },
    "liveness_suite": ["ir_flicker","ultrasonic"],
    "consistency_rules": ["vel_bound","alt_bound","rf_tof"],
    "calibration_required": true,
    "validity_days": 365,
    "latency_budgets": {
        "ingress_budget_ms": 5,
        "proof_prefetch": true,
        "head_cache_ttl_ms": 2000,
        "vrr_support": true
    },
    "deny_taxonomy": [
        "POLICY_DENIED","PROOF_REQUIRED","TIME_BUDGET_EXCEEDED",
        "STALE_HEAD","CONSISTENCY_FAIL","SPOOF_DETECTED","PERMIT_REPLAY",
        "LIVENESS_REQUIRED","CALIBRATION_EXPIRED","SENSOR_HEALTH_FAIL",
        "QUORUM_UNAVAILABLE","PLATFORM_ATTEST_FAIL"
    ],
    "observability": {
        "siem_export": true,
        "soar_playbook_ref": "soar:...",
        "itsm_ticketing": true
    },
    "governance": {
        "policy_pack_id": "pol:...",
        "control_ids": ["ISO27001-A.12","GDPR-A32"]
    "status_endpoints": {
        "permit_status_url": "https://.../permit/status",
        "health_status_url": "https://.../sensor/health"
    },
    "attestation": {
        "avb_vbmeta_digest": true,
        "avb_rollback_index": true,
        "apple_sepos_hash": true,
        "apple_localpolicy_posture": true
    },
    "versioning": { "semver": "MAJOR.MINOR", "ignore_unknown_fields": true },
    "ext": { }
}
```

[E2N] Notes (evidence-only; non-dispositive).

The Conformance Manifest signals capability posture for audit/RFP; it does not alter TSIL ingress gate semantics. Parsers SHOULD ignore unknown fields; ext is reserved for forward compatibility. Badges or listings derived from this manifest are revocable and evidence-only.

[E3] Certification Result (evidence-only interoperability object).

A verifier MAY produce a digitally signed Certification Result committing to receipt/head identifiers and policy profile. All fields below are optional & evidence-only-they do not alter TSIL gating.

PAD Level 1/Level 2 style vectors (photo/video/3D mask/deepfake), with latency histograms and deny-code breakdowns; results are evidentiary only and MUST NOT alter gate semantics. (Illustrative; non-limiting.)

[E6B] Vectors SHOULD include cross-dataset transfer cases and publish APCER/BPCER/ACER/EER histograms; results are evidentiary only and MUST NOT alter gate semantics.

[E7] Governance-as-Code linkage (illustrative).

Deployments MAY expose a policy_pack_id, control_ids[ ], and an evidence_map[ ] (control→proof refs) for audit-only mapping. Absence is non-dispositive.

```
[E4] TSIL-CertificationResult
{
  "type": "TSIL-CertificationResult",
  "version": "1.0",
  "status": "PASS|HOLD|FAIL|STALE|REVOKED",
  "codes": ["..."],
  "profile": "TSIL-Core|TSIL-Pro|TSIL-Privacy|TSIL-Auto|TSIL-Edge-Lite",
  "issued_at": "2025-09-16T12:00:00Z",
  "verifier_id": "did:verifier:...",
  "cert_id": "uuid:...",
  "head_ids": ["sth:...", "sth:..."],
  "proofs_summary": { "inclusion": "PASS|FAIL", "append_only_evolution": "PASS|FAIL" },
  "freshness_policy_ref": "https://.../mmd-policy",
  "status_staple": { "ocsp_like": true, "this_update": "2025-09-16T12:00:00Z", "next_update":
"2025-09-16T12:05:00Z" },
  "ct_compatible_heads": true,
  "cross_rail_refs": {
    "mlr_ref": "mlr:...",
    "urc_ref": "urc:...",
    "isl_settlement_receipt_ref": "isl:...",
    "oic_receipt_ref": "oic:...",
    "thp_pt_ref": "thp:pt:..."
  },
  "vc_presentation": {
    "media_type": "application/vp+ld+json|vp+sd-jwt",
    "status_list": "https://.../statuslist/..."
  },
  "observability": {
    "siem_event_ref": "siem:...",
    "itsm_ticket_id": "it: INC-12345"
  },
  "signature": "sig:...",
  "ext": { }
}
```

[E4N] Notes (evidence-only; non-dispositive).

cross_rail_refs and vc_presentation support audit/export (e.g., AML-Gate MLR, UPL URC, ISL/PoPC receipts, THP presence tokens). status_staple and ct_compatible_heads align with OCSP/CT operational norms. All such fields are optional and do not alter TSIL ingress gate semantics.

[E5] Conformance tiers (communication-only).

Tier A (Core): TSIL-Core+single-log freshness (inclusion+evolution).

Tier B (Pro): +k-of-m quorum+continuity chain+optional attested transport.

Tier C (Enterprise/Gov/Auto): +liveness/consistency suites, calibration validity, governance evidence export.

Tiers are illustrative; functionally equivalent postures are in scope.

[E6] Acceptance tests (summary; vectors in Appx. L).

A conformance bench MAY execute canned traces and assert expected outcomes (SPOOF_DETECTED, CONSISTENCY_FAIL, TIME_BUDGET_EXCEEDED, STALE_HEAD, HOLD→PASS). Manifests MAY publish pass/fail counts and latency histograms; results are evidentiary only.

[E6A] PAD tier mapping (template; non-binding). A conformance bench MAY publish liveness outcomes mapped to

[E8] Versioning & deprecation.

Artifacts MAY use MAJOR.MINOR; parsers SHOULD ignore unknown fields; senders SHOULD dual-write during minor transitions; breaking changes in MAJOR only.

[E9] Badging & Revocation (illustrative; communication-only).

Conformance badges are cryptographically signed and revocable; a revocation event MAY be published to the same append-only log family used for heads/proofs (evidence-only; does not affect gate semantics).

[E10] Evidence-only reminder.

All conformance/certification artifacts in this Appendix are evidence-only and non-dispositive of TSIL gate semantics; the gate predicates and decision logic remain defined in the core specification.

Appendix F—Reference Builds (Illustrative; Non-Limiting)

All builds are enablement examples; gate semantics unchanged. Names of APIs/surfaces are illustrative and non-exhaustive.

[F1] OS HAL/Bus Gate (illustrative; evidence-only).

Patch the driver/bus admission path; enforce validation at submit and/or commit of the driver ring buffer (e.g., Android Sensors/Camera HAL activate( )/batch( ) prior to poll( ); Linux V4L2/Media enable/queue prior to userspace read ( )/poll( ); deny or HOLD on proof/policy deficit; no subscriber sees samples before PASS. Gate semantics unchanged.

[F2] Camera/Mic Liveness Plugin (illustrative; evidence-only).

Provide IR-flicker/structured-light/ultrasonic challenge-response; mismatch or missing challenge maps to SPOOF_DETECTED or LIVENESS_REQUIRED; liveness verdict is one predicate to ingress. Gate semantics unchanged.

[F3] RF/GNSS Consistency Agent (illustrative; evidence-only).

Fuse time-of-flight/multi-tower/GNSS constellation with IMU/barometer; encode bounds in a DAG; contradictions map to CONSISTENCY_FAIL. Gate semantics unchanged.

[F4] Verifier Service (illustrative; evidence-only).

Maintain signed-head cache with MMD-bounded prefetch; verify inclusion and, on head advance, append-only evolution (consistency); optional k-of-m quorum; emit Certification Result and EvidenceBundle. Gate semantics unchanged.

[F5] Conformance Bench (illustrative; evidence-only).

Replay spoof/replay/contradiction/timeout traces; assert expected deny codes (e.g., STALE_HEAD, CONSISTENCY_FAIL, TIME_BUDGET_EXCEEDED); produce EvidenceBundles for audit. Gate semantics unchanged.

[F6] Calibration Verifier (illustrative; evidence-only).

Check CalibrationCertificate validity periodically; expiry maps to CALIBRATION_EXPIRED; evidentiary only. Gate semantics unchanged.

[F7] Sensor Health Monitor (illustrative; evidence-only).

Track bias/noise/drift; degradation beyond policy maps to SENSOR_HEALTH_FAIL; outputs a SensorHealthStatus object; evidentiary. Gate semantics unchanged.

[F8] Permit/Status Responder (illustrative; evidence-only).

OCSP-style SensorPermitStatus (GOOD|REVOKED|EXPIRED|UNKNOWN); stapling MAY accompany admission decisions; billable API surface; evidentiary. Gate semantics unchanged.

[F9] SIEM/SOAR/ITSM Connectors (illustrative; evidence-only).

Export deny telemetry and certificate refs; trigger playbooks/tickets; observability only. Gate semantics unchanged.

[F10] Edge-Lite Kit (illustrative; evidence-only).

Implement Short-Permit (HOLD) for intermittent links; auto-upgrade to PASS on continuity or lapse to DENY; optional down-sampling/masking under HOLD. Gate semantics unchanged.

[F11] Developer SDK (illustrative; evidence-only).

Canonicalization helpers, proof validators, HAL hooks; sample code for S2 generation/verification; reference tests. Gate semantics unchanged.

[F12] TSIL-Bridge (legacy gateway) (illustrative; evidence-only).

Inline shim for legacy sensor buses (e.g., CAN, 1553, CSI); re-emits TSIL-gated streams with S2/EvidenceBundle; holds/denies on proof deficits; preserves ordering/priority. Gate semantics unchanged.

[F13] TSIL-Bridge (CAN) (illustrative; evidence-only).

Terminates legacy CAN links; emits TSIL-gated streams with S2/EvidenceBundles; preserves arbitration/ordering; integrates with IDS/bus-guardian; holds/denies on deficits. Gate semantics unchanged.

[F14] IP-Camera/RTSP Edge Gateway (illustrative; evidence-only).

Bridges RTSP/RTP/IP-camera feeds into TSIL: ingress validate→permit→S2; deny on STALE_HEAD/PROOF_REQUIRED/PLATFORM_ATTEST_FAIL; parity receipts for camera→host; divergence yields HOLD/FAIL with labeled reason. Gate semantics unchanged.

[F15] Attested Transport Binding (TEE/IO) (illustrative; evidence-only). Bind gate↔verifier channel using TEE-IO posture (e.g., exporter value, IOMMU protections); mismatch maps to PLATFORM_ATTEST_FAIL; evidentiary inputs only. Gate semantics unchanged.

[F16] Privacy/ZK Predicate Plugin (illustrative; evidence-only).

Evaluate set-membership/range predicates (e.g., geofence) without raw disclosure; failure maps to PRIVACY PROOF_REQUIRED/FAIL; verdict is an input to admission. Gate semantics unchanged.

[F17] IP-Camera/Width-Jitter Defense (illustrative; evidence-only).

For networked cameras (e.g., GigE Vision GVSP), a bridge randomizes and verifies a small, per-frame width (or similar metadata) and rejects frames whose decoded width does not match the requested one; this breaks full/stripe/patch injections that can't re-synthesize the stream in real-time. Defense is reported in logs; gate semantics unchanged.

[F18] Spatio-Temporal Consistency Plugin (illustrative; evidence-only).

A CPU-light, <100 ms detector checks for global space tearing/shift, entity/semantic confusion, and target flicker (as in AV spoof taxonomies) and emits advisory verdicts that feed the CONSISTENCY predicate at ingress. Evidence-only; gate semantics unchanged.

[F19] Magnetic-guard/ESD plugin. A light in-sensor guard (e.g., ESD coil/Hall pair) exposes esd_guard_triggered, b_field_gauss, and saturation_margin_db into S2 evidence; policy maps anomalies to MAGNETIC_SPOOF or HOLD. No change to gate semantics; evidence is consumed by SIEM and conformance benches. (Aligned with HALC's design; purely evidentiary.)

[F20] TSIL-Scan DICOM/PACS Gateway (illustrative; evidence-only).

A gateway/proxy terminates modality ingress, generates S2-MED, anchors to a signed head, validates under freshness, and admits to PACS/VNA only on PASS; emits EvidenceBundles for audit. Optional dual-anchor with PACS object hash. Gate semantics unchanged.

Equivalents are within scope if they preserve the gate semantics taught in the core sections (submit/commit enforcement, cryptographic freshness/evolution under a freshness policy, fail-closed behavior, and structured denial).

Appendix G—Security/Threat Model (Excerpt; Illustrative; Non-Limiting; Evidence-Only)

Scope. TSIL mitigates pre-admission sensor abuse by enforcing fail-closed HAL/bus gating under signed-head freshness and append-only evolution (consistency) proofs, with optional quorum/continuity, liveness, and multi-sensor consistency. Audit-only artifacts (S2, Certification Result, EvidenceBundle) support incident response and governance. References below are examples; policy decides mapping to PASS/HOLD/FAIL.

[G1] Replay.

Risk: token/proof/event reuse.

Mitigations: anti-replay tuple; single-use/TTL permits; idempotency keys; audience/scope bind.

[G1A] Camera replay (illustrative). Risk: firmware-level or RTSP-level replay of prior frames to safety systems; Mitigations: ingress nonces/session-IDs, per-frame counters, and REPLAY DETECTED deny code; optional exporter fields (rtsp_session_nonce, frame_counter) are evidence-only. (Illustrative; gates unchanged.)

[G1B] Magnetic spoofing (illustrative). Risk: external B-field injection against Hall/classic current sensors causing controller drift or DoS; Mitigations: guard-sensor/ESD coil corroboration, saturation margin monitoring; policy MAY map to MAGNETIC_SPOOF, with saturation_margin_db and b_field_gauss exported as evidence. (Illustrative; gates unchanged.)

[G2] Tampering/equivocation.

Risk: forged receipts; log split-view.

Mitigations: anchoring; inclusion+append-only evolution (consistency); optional dual-anchor/quorum; continuity chains.

[G2A] Adjacent active defenses (illustrative).

Deployments MAY pair TSIL deny/continuity telemetry with on-bus/passive controllers (e.g., targeted retransmission that escalates attackers into error-passive/bus-off). TSIL does not alter bus arbitration; exports evidence for such controllers to act.

[G3] Liveness bypass.

Risk: screen-replay; speaker injection.

Mitigations: active liveness (IR/ultrasonic); passive entropy; LIVENESS_REQUIRED on missing challenge.

[G3A] Deepfake & presentation attacks (illustrative).

Risk: photo/video replay; 3D mask; deepfake injection.

Mitigations: active challenge; passive micro-motion/texture/depth; deny codes SPOOF DETECTED/LIVENESS_RE-QUIRED.

[G3B] Relay/re-feed/screen-into-camera.

Risk: off-path relays add RTT; screen re-feeds mimic live scenes.

Mitigations (evidence-only): active_challenge (token/nonce/RTT), latency_observed_ms, time_sanity_ref, and display_binding provide audit breadcrumbs; policy MAY map to HOLD/FAIL with RELAY_SUSPECTED noted in anomaly_flags.

[G3C] AI-driven mimicry (illustrative).

Risk: synthetic voice/face/body motion generated to imitate a real user in real time.

Mitigations: active liveness (token/nonce/RTT), passive micro-motion/texture/depth, and deny codes (SPOOF_DE-TECTED/LIVENESS_REQUIRED); advisory crumbs include active_challenge, latency_observed_ms, time_sanity_ref, and display_binding (evidence-only).

[G4] Multi-sensor contradiction.

Risk: GPS says A; IMU says B.

Mitigations: consistency DAG (velocity/altitude/FoV bounds); contradictions→CONSISTENCY_FAIL.

[G5] Clock skew/time spoof.

Risk: forging trusted_event_time.

Mitigations: TEE monotonic+attested time; head-age checks; freshness (MMD); optional time_sanity_ref audit.

[G6] Cache poisoning.

Risk: stale/forged head in cache.

Mitigations: signed-head validation; TTL; continuity checks; on doubt→HOLD/FAIL.

[G6A] Log/operator risk.

Risk: single-operator log misbehavior.

Mitigations: quorum diversity (org/geo/impl) and continuity chains; QUORUM_UNAVAILABLE/HEAD_CONFLICT on disagreement.

[G7] DoS/timing.

Risk: proof delays; ISR starvation.

Mitigations: budgets; head cache+prefetch; TIME_BUD-GET_EXCEEDED; backpressure (RATE_LIMIT).

[G7A] CAN attack notes (illustrative).

Risk: floods, error-passive spoofing, double-receive, bus-off, wire-cut partition.

Mitigations: TSIL pre-admission evidence+fail-closed gating; exported evidence feeds IDS/gateways.

[G8] Key compromise.

Risk: stolen/rotated keys undetected.

Mitigations: sealed keys; key-continuity evidence; discount/deny below threshold.

[G9] Calibration & drift.

Risk: sensor bias shifts.

Mitigations: CalibrationCertificate validity; SensorHealth-Status; deny CALIBRATION_EXPIRED/SEN-SOR_HEALTH_FAIL.

[G10] Cross-tenant leakage.

Risk: token reuse across tenants.

Mitigations: tenant_id isolation; audience binding; per-tenant rate limits.

[G11] Data exfiltration via artifacts.

Risk: PII leakage in receipts/certs.

Mitigations: digests/refs; redaction; ZK predicates.

[G11A] Adversarial physical patches.

Risk: physical textures trigger false recognitions.

Mitigations (evidence-only): anomaly_flags: ["ADVER-SARIAL_PATCH"] for SOC correlation; policy MAY raise to HOLD with advisory labeling.

[G12] Transport downgrade/MI™.

Risk: weaker channel acceptance.

Mitigations: optional attested transport; require exporter/attestation match else PROOF_REQUIRED or PLATFOR-M_ATTEST_FAIL.

[G12A] IP-camera stream injection.

Risk: full/stripe/patch frame insertion on networked cameras.

Mitigations (evidence-only): stream_params/transport_params+param_commitment for expected stream profile; mismatch→FRAME_INJECTION (policy decides HOLD/FAIL); parity receipts for camera↔host.

[G12B] Optical dazzle/exposure confusion.

Risk: LEDs/lasers blind or desensitize auto-exposure.

Mitigations (evidence-only): anomaly_flags and AUTO_EXPOSURE_JAMMED evidence; pair with active liveness and policy gating.

[G13] Firmware/pipeline compromise.

Risk: malicious sensor firmware; injected pipeline stages.

Mitigations: boundary_measurement attestation; secure update; agent_id/version audit; discount/deny on mismatch.

[G14] Offline continuity.

Risk: abuse of intermittent links to slip stale data.

Mitigations: Short-Permit (HOLD) with auto-upgrade on continuity; OFFLINE_EXPIRED on lapse; watermark advisory while in HOLD.

[G15] Egress misuse/re-broadcast.

Risk: recording/forwarding without permit.

Mitigations: enforce permit at record/forward APIs; re-broadcast without permit maps to policy deny.

Governance note (illustrative; evidence-only).

Mappings to safety frameworks (e.g., EU AI Act risk management, logging, incident response) are supported via Certification Results, EvidenceBundles, and deny-code telemetry; such mappings are advisory and do not alter TSIL gate semantics.

Appendix H—Functional Equivalents & Construction Aids (Illustrative; Evidence-Only; Non-Limiting)

This appendix provides non-exhaustive, function-oriented equivalences and interpretive guidance; names are illustrative and function controls. These materials are illustrative, evidence-only, and do not alter gate predicates or claim scope.

[H1] Logs/proofs (functional equivalence).
"Signed head" includes a signed tree head, a signed set head, or a functionally equivalent accumulator or vector-commitment head that supports inclusion and append-only evolution (consistency) proofs validated under a freshness policy (illustrative; non-limiting). "Freshness policy" includes maximum-merge-delay windows; numeric values are illustrative.

[H1A] Proof transport.
Validating inclusion/evolution may use embedded, referenced, or verifier-retrieved proofs;
transport is non-limiting.

[H1B] Trusted boundary equivalence.
TEE/HSM/verifiably deterministic audited sandbox and functionally equivalent secure execution boundaries are equivalent if they support attestation+sealed keys.

[H1C] Sensor-permit synonyms.
"Permit," "capability," or "authorization token/handle" are equivalent if bound to S2/scope digests and enforce scope/audience/TTL/revocation semantics.

[H1D] Read/subscribe surfaces.
"OS read/subscribe path" includes submit, commit, present/notify, and egress-forward/record surfaces; names are illustrative.

[H1E] Liveness equivalence.
Active challenges include IR/optical flicker/ultrasonic and functionally equivalent stimulus-response families; passive entropy tests are equivalents when they provide comparable spoof resistance.

[H1E.1] Liveness technique families (illustrative).
Texture/micro-texture (e.g., LBP), frequency-domain (FFT/spectral histograms), color-texture/chroma, depth/shape (depth maps/structured-light), and micro-motion/micro-expressions are equivalent when they provide substantially similar spoof resistance.

[H1F] Consistency-graph equivalence.
Multi-sensor graphs may include GPS/IMU/barometer/camera/RF or functionally similar modalities; bounds are illustrative.

[H1G] Fail-closed semantics.
"Fail-closed" includes DENY or HOLD with restricted rights pending proof completion; policy decides when HOLD MAY upgrade to PASS.

[H1H] Notation.
ASCII "S2" and typographic "S2" denote the same construct; names in schemas/IDs are ASCII; labels in prose/figures MAY be typographic.

[H1I] Evidentiary fields.
Governance tags, KPI/risk scores, CalibrationCertificate/SensorHealthStatus, and similar objects are evidence-only and non-dispositive for admission/deny. [H1J] Quorum diversity equivalence.

Diversity MAY be organizational, geographic, or implementation-class; functionally equivalent diversity controls remain in scope.

[H1K] Admission-surface equivalence.
"OS sensor bus," "HAL," and "driver ring buffer" are exemplary admission surfaces. Functionally equivalent admission surfaces also include: kernel/driver intercepts; DMA queue admit points; secure sensor hubs; virtualization shims; gateway/proxy bridges; network offload devices (SmartNICs/DPUs); ISP/encoder pipelines; FPGA/ASIC bridges; neural sensor fabrics; accelerator DMA queues/fences; and RTOS/firmware driver commit points-provided the gate is applied before subscriber visibility (illustrative; non-limiting). Evidence-only cross-rail references (e.g., compositor receipts such as TRC $R^2$) are within scope for audit and do not alter ingress predicates.

[H1L] Attested transport equivalence.
Transport binding includes link-, bus-, or session-level bindings (e.g., exporter values/IOMMU protections) that provide substantially similar authenticity and anti-downgrade guarantees.

[H1M] Privacy mechanism equivalence.
Privacy-preserving proofs include zero-knowledge, multi-party computation, trusted-boundary evaluation with redacted outputs, or functionally equivalent mechanisms that prove policy satisfaction without raw disclosure.

[H1N] Offline continuity equivalence.
Continuity-preserving offline roll-ups that are later anchored to a signed head are equivalent when they deliver substantially similar freshness and append-only evolution (consistency) guarantees.

[H1O] Audit-crumb equivalence.
Optional audit crumbs such as time_sanity_ref (multi-source time corroboration) and display_binding (panel ID/present fence) are evidence-only and do not alter gate semantics.

[H1P] Cross-rail evidence equivalence.
Audit references to MLR (AML-Gate), URC (UPL), ISL/PoPC receipts, C2PA manifests, VC/VP status, or THP presence tokens are evidence-only; TSIL gate semantics remain ingress-bound. Audit references MAY include NOVACOV permit/IAL, UPTX PET/ledger, and PAYGATE TETpay/DSC entries; evidence-only; TSIL ingress semantics remain unchanged.

[H1Q] Cryptographic-suite equivalence (illustrative; non-limiting).
"Digital signature," "hash," "accumulator," and "vector-commitment" include any suite that provides substantially similar security properties (e.g., collision resistance, preimage resistance, unforgeability), including post-quantum schemes and functional equivalents. Algorithm names are illustrative; function controls.

[H2] Open terms.
"Comprising/including" are open-ended; singular includes plural; "or" is inclusive unless context dictates otherwise. No element invokes 35 U.S.C. § 112(f) absent "means for/step for."

Appendix I—ATT&CK/Audit Mappings (Evidence-Only; Non-Limiting)

Scope. This appendix maps TSIL artifacts to MITRE ATT&CK® Data Source: Application Log (DS0015) to aid SIEM/SOAR/ITSM integrations. Mappings are evidence-only and do not alter TSIL gate semantics.

I.1 Event types→audit channels

SensorReceipt (S2)→Application Log Content event_type:"tsil.s2", head_id, proofs_summary, live-ness.verdict, consistency.verdict, anti_replay.tu-ple_id, permit_id/status, deny_code (if any), sen-sor_id, ts CertificationResult→Governance/Policy event_type:"tsil.cert", status, codes[ ], head_ids[ ], pro-file, issuer, this_update/next_update (if stapled)

EvidenceBundle→Audit Package event_type:"tsil.evb", bundle_id, receipt_core_digest, head_ids[ ], proof_refs[ ], cert_result_ref SensorPermitStatus→OCSP-style status event_type:"tsil.permit.status", permit_id, status: GOOD|REVOKED|EXPIRED|UNKNOWN, last_checked, next_update GateHealthReceipt→Sensor/host posture event_type:"tsil.gate.health", pass_rate, head_cache_a-ge_ms, deny_code_breakdown { } (advisory)

I.2 Canonical deny-code hooks

Correlate deny_code to behaviors such as:

SPOOF_DETECTED, LIVENESS_REQUIRED, CONSIS-TENCY_FAIL, STALE_HEAD, PROOF_REQUIRED, QUORUM_UNAVAILABLE, PERMIT_REPLAY, TIME_BUDGET_EXCEEDED, CALIBRATION_EXPIRED, SENSOR_HEALTH_FAIL, PLATFORM_ATTEST_FAIL, FRAME_INJECTION, AUTO_EXPOSURE_JAMMED. (Literal strings defined in the deny-code appendix; unknown codes SHOULD be preserved.)

I.3 Example SIEM queries (illustrative)

Freshness drift: head_age_ms>policy→cluster on deny_code="STALE_HEAD" by device/sensor.

Quorum failures: deny_code="QUORUM_UNAVAILABLE" OR deny_code="HEAD_CONFLICT"; alert on spikes.

Liveness anomalies: deny_code IN ("SPOOF_DE-TECTED", "LIVENESS_REQUIRED") with sensor_type in ("camera", "mic").

Offline expiry: deny_code="OFFLINE_EXPIRED" where policy_epoch advanced.

Attestation posture: deny_code="PLATFORM_ATTEST_FAIL"; join with device attestation feed.

IP injection detection: deny_code="FRAME_ INJEC-TION" OR transport_params!=param_commitment grouped by device_id. (Stripe/patch/full-frame)

Dazzle bursts: spikes in deny_code="AUTO_ EXPO-SURE_JAMMED" with high optical power events; correlate with vehicle head/tail camera posture.

Spatio-temporal conflicts: correlate CONSISTEN-CY_FAIL with plugin's conflict class (space tearing/shift/entity/semantic/flicker) to spot adversarial scenes under 100 ms latency.

I.4 Store/governance reports (illustrative)

Use CertificationResult streams to populate governance dashboards (counts by profile: TSIL-Core/Pro/Privacy/Auto/Edge-Lite; deny-code histograms; latency SLOs). Evi-dence-only-no change to gate semantics.

IP-injection burst: deny_code=="FRAME_INJECTION" grouped by device_id/camera_id; join on param_mismatch==true.

Relay suspicion: anomaly_flags CONTAINS "RELAY_SUSPECTED" where latency_observed_ms> thresh-old.

[I.5] SIEM event (illustrative)
{ "event_type":"tsil.s2",
    "device_id":"dev:...", "sensor_id":"sns:...",
    "head id":"sth:...", "deny_code":"STALE_HEAD|...",
    "liveness":"PASS|FAIL", "consistency":"PASS|FAIL",
    "latency_ms":7, "head_age_ms":420, "permit_id": "perm:...", "ts": "2025-09-16T12:00:00Z"
}

Note: evidence-only; no change to gate semantics.

Appendix L—Conformance Vectors (Illustrative; Non-Limiting; Report-Only)

Vectors define test names, setup, and expected outcomes for conformance benches. They are report-only and do not alter gate semantics or claims.

[L1] STALE_HEAD

Setup: serve a head older than policy MMD.

Expect: DENY/HOLD with deny_code: "STALE_HEAD"; no subscriber visibility.

[L2] TIME_BUDGET_EXCEEDED

Setup: delay proofs beyond ingress_budget_ms.

Expect: DENY with deny_code: "TIME_BUDGET_EX-CEEDED" within the frame/ISR budget.

[L3] CONSISTENCY_FAIL

Setup: GPS/IMU/barometer contradictions (exceed bounds).

Expect: DENY/HOLD with deny_code: "CONSISTEN-CY_FAIL".

[L4] SPOOF_DETECTED/LIVENESS_REQUIRED

Setup: fail active liveness challenge or omit required modality challenge.

Expect: SPOOF_DETECTED or LIVENESS_RE-QUIRED.

[L5] QUORUM_UNAVAILABLE/HEAD CONFLICT

Setup: missing k-of-m attestation or diverging STHs.

Expect: HOLD with conflict record; deny_code: "QUO-RUM_UNAVAILABLE" or HEAD_CONFLICT.

[L6] PERMIT_REPLAY

Setup: reuse a previously minted sensor-permit.

Expect: DENY with deny_code: "PERMIT_REPLAY".

[L7] CALIBRATION_EXPIRED

Setup: invalid/expired CalibrationCertificate.

Expect: DENY with deny_code: "CALIBRATION_EX-PIRED".

[L8] SENSOR_HEALTH_FAIL

Setup: bias/noise/drift exceeds thresholds.

Expect: DENY/HOLD with deny_code: "SEN-SOR_HEALTH_FAIL".

[L9] PLATFORM_ATTEST FAIL

Setup: exporter mismatch/attestation posture failure on the ingress channel.

Expect: DENY/HOLD with deny_code: "PLATFOR-M_ATTEST_FAIL".

[L10] OFFLINE_EXPIRED

Setup: Short-Permit (HOLD) lapses without continuity within policy window.

Expect: DENY with deny_code: "OFFLINE_EXPIRED"; watermark advisory persisted.

[L11] PRIVACY_PROOF_REQUIRED/FAIL

Setup: missing or failing ZK predicate (e.g., in-zone/age threshold).

Expect: PRIVACY_PROOF_REQUIRED or PRIVACY_PROOF_FAIL.

[L12] PAD L1/L2 (camera anti-spoof tiers)

Setup: conformance datasets for presentation-attack detection tiers.

Expect: pass/fail counts recorded; deny codes as per L4; report-only.

[L13] SESSION_STATE_DENY (WebXR/session transitions) (report-only)

Setup: deny occurs precisely at OpenXR/WebXR state transition boundaries.

Expect: labeled deny with matching session state; report-only.

Vector result format (suggested)

{"name": "Lx", "status": "PASS|FAIL", "deny_code": " . . . ", "latency_ms": N, "head_age_ms": N, "notes": " . . . "}

[L14] FULL_FRAME_INJECTION_BLOCKED

Setup: inject a full replacement frame over the IP camera path (e.g., GVSP/RTSP).

Expect: deny_code: "FRAME_INJECTION"; no subscriber visibility; advisory label reason logged.

[L15] STRIPE_PATCH_INJECTION_BLOCKED

Setup: inject stripe/patch overlays (e.g., stop-sign/red-light textures) at line-rate.

Expect: deny_code: "FRAME_INJECTION" from stream/transport param violation or param_commitment mismatch; object not recognized; advisory label recorded.

[L16] AUTO_EXPOSURE CONFUSION

Setup: burst IR/laser dazzler or LED; camera auto-controls perturbed.

Expect: AUTO_EXPOSURE_JAMMED evidence; optional HOLD if policy requires.

[L17] SPATIO_TEMPORAL_CONFLICTS

Setup: replay/relay or projected phantom causing space tearing/shift or entity/semantic confusion; plugin enabled.

Expect: CONSISTENCY_FAIL (and conflict class label) in <100 ms.

[L18] RELAY_LATENCY_DETECTED

Setup: introduce relay/re-feed path (screen-replay or camera re-feed) producing additional RTT.

Expect: latency_observed_ms exceeds policy; vector result FAIL/HOLD (policy) with anomaly_flags: ["RELAY_SUSPECTED"]; no change to gate semantics.

[L19] ACTIVE_CHALLENGE RTT OUT OF RANGE

Setup: respond to an active challenge token with delayed or mismatched proof.

Expect: challenge RTT or nonce/token_id mismatch labeled; anomaly_flags: ["RELAY_SUSPECTED"]; policy MAY map to HOLD/FAIL.

[L20] Conformance vectors (attackable, reproducible)

GPS_SPOOF_MATCH_DELAY/GPS_SPOOF_NON-MATCH_DELAY; GNSS_CROSSCHECK_FAIL (location/time drift).

MIC_REPLAY_LOW_RIR/MIC_REPLAY_HIGH_RIR (replayed audio degrades detection; spatial rescue)

RTSP_CAMERA_REPLAY (firmware-level replay)

PAD_EER_PROFILE: include EER/FAR/FRR metrics (report-only) for policy tuning.

L21 MAGNETIC_DC_SPOOF—inject DC B-field; expect deny_code:"MAGNETIC_SPOOF" or HOLD with saturation_margin evidence; no subscriber visibility.

L22 MAGNETIC SINE_SPOOF—inject low-freq sinusoid; same expectation; record latency_observed_ms for audit.

L23 MAGNETIC_PULSE_SPOOF—inject square/pulsating B-field; same expectation.

L24 SATURATION_ATTACK—drive sensor into saturation; expect HOLD/FAIL with saturation_margin_db≤0 and esd_guard_triggered: true; no visibility.

Result envelope (suggested JSON, report-only)
{ "name": "L14",
  "status": "PASS|FAIL",
  "deny_code": "FRAME_INJECTION",
  "latency_ms": 47,
  "param_mismatch": true,
  "notes": "stripe injection; width mismatch vs param_commitment"
}
(All vectors remain report-only; they do not alter gate semantics.)

Appendix K—Ethical-Use Covenant (Communication-Only; Non-Binding; Non-Limiting)

Purpose. The Applicant intends TSIL to advance truthful sensing, protect vulnerable users, and reduce harm from AI mimicry and manipulation. This covenant is illustrative, evidentiary, and non-dispositive; gate semantics remain defined by the claims and core specification.

K1. Truth-first sensing.

Deployments SHOULD favor policies that detect and block spoof/replay/deepfake inputs before model or UX use.

K2. Protection of the vulnerable.

Profiles MAY default to safer postures for minors and at-risk contexts (Kids/Critical), with clear deny reasons and accessibility-aware feedback (e.g., machine-audible labels), without changing gate semantics.

K3. Transparency & accountability.

Operators SHOULD export Certification Results/EvidenceBundles and retain audit-logs consistent with law/regulation. These artifacts are evidence-only and do not alter 'PASS/HOLD/FAIL' semantics.

K4. Incident response.

During incidents, deployments MAY tighten freshness windows, shorten status next_update, and quarantine misbehaving sensors (see § [0100]-[0101]); incident metadata is evidentiary; claims control.

K5. Non-suppression and non-manipulative use.

Deployments SHOULD NOT use TSIL or its evidence mechanisms to intentionally distort, censor, or selectively drop sensor evidence in ways that mislead affected users, regulators, or communities. Governance and policy structures SHOULD favor uses that increase safety, accountability, and fairness, and SHOULD treat attempts to weaponize TSIL for targeted repression or systemic manipulation as out of scope for acceptable deployment. This covenant is illustrative and evidentiary only; gate semantics and claim scope remain defined by the core specification.

The invention claimed is:

1. A computer-implemented system comprising one or more processors and memory storing instructions that, when executed, cause the system to operate as a sensor ingress rail, the system configured to:

(a) execute at least a portion of sensor acquisition within a trusted boundary;

(b) deterministically canonicalize a sensor event and compute a Sensor Receipt (S2) comprising at least a boundary measurement, an input digest, a monotonic counter, a trusted event time, and an anti-replay tuple;

(c) anchor a commitment of the S2 to an append-only log that publishes signed heads and supports inclusion and append-only-evolution (consistency) proofs under a freshness policy;

(d) validate inclusion under the freshness policy and, responsive to a head change observed within a freshness policy window, validate an append-only-evolution (consistency) proof; and (e) via an ingress gate, admit the sensor event to an operating-system (OS) read/subscribe path only after the successful validation, and otherwise, by the ingress gate, return a Structured Precondition-Failure (code) and withhold the event such that no read/subscribe consumer or DMA client can observe the event before admission.

2. The system of claim 1, deployed on a device comprising a sensor interface and an ingress gate coupled to an OS sensor bus, the system further configured to:

(a) enforce fail-closed admission within a latency budget;

(b) perform at least one active liveness challenge for a modality selected from the group consisting of camera, microphone, and RF, and the system denies admission upon mismatch; and (c) emit signed evidence of allow-or-deny decisions including timing measurements.

3. The system of claim 1, further comprising executable instructions that, when executed by the one or more processors, cause the system to: (a) validate S2 proofs and multi-sensor consistency graphs across at least two modalities selected from the group consisting of GPS, IMU, barometer, and camera; and (b) emit a digitally signed Certification Result committing to a receipt identifier, at least one head identifier, and a verifier identity.

4. The system of claim 1, further comprising a privacy component configured to accept zero-knowledge predicates proving satisfaction of a policy constraint for a sensor event without revealing raw sensor data, wherein failing or missing proofs map to a Structured Precondition-Failure (code) selected from the group consisting of PRIVACY_PROOF_ REQUIRED and PRIVACY_PROOF_FAIL.

5. The system of claim 1, wherein the anti-replay tuple comprises at least one item selected from the group consisting of a nonce, a policy epoch identifier, and a profile identifier.

6. The system of claim 1, wherein the freshness policy enforces a maximum-merge-delay window, and validation failure maps to STALE_HEAD.

7. The system of claim 1, further configured to perform at least one active liveness challenge for a modality selected from the group consisting of camera, microphone, and RF, the challenge comprising at least one of an optical flicker, an infrared pattern, or an ultrasonic watermark, wherein a mismatch maps to SPOOF_DETECTED.

8. The system of claim 1, further comprising a consistency graph that encodes velocity or altitude bounds across modalities, wherein a contradiction maps to CONSISTENCY_FAIL.

9. The system of claim 1, wherein admission includes minting a sensor-permit that is scope-bound, time-to-live limited, and single-use, and rebinding attempts map to PERMIT_REPLAY.

10. The system of claim 1, wherein the ingress gate supports a Short-Permit (HOLD) with reduced resolution or rate until quorum or continuity is completed.

11. The system of claim 1, wherein denial returns a Structured Precondition-Failure (code) selected from the group consisting of POLICY_DENIED, PROOF_RE-QUIRED, and TIME_BUDGET_EXCEEDED.

12. The system of claim 1, wherein a local signed-head cache and proof prefetch are maintained with a time-to-live configured to satisfy the latency budget.

13. The system of claim 1, wherein the privacy component validates zero-knowledge predicates comprising set-membership or range proofs.

14. The system of claim 1, wherein recording or forwarding APIs enforce the sensor-permit at egress, and re-broadcast without a valid permit is denied.

15. The system of claim 1, wherein radio-frequency (RF)/global navigation satellite system (GNSS) path proofs selected from the group consisting of time-of-flight and multi-tower triangulation are included in an S2 extension.

16. The system of claim 1, wherein the Certification Result includes a profile identifier, a status, at least one code, head identifiers, a verifier identity, and an issuance time-stamp.

17. The system of claim 1, wherein, upon admission, the system returns allow-or-deny evidence signed within the trusted boundary and anchored to the append-only log, and wherein the system is further configured to package the allow-or-deny evidence into an EvidenceBundle and to (i) include in the EvidenceBundle one or more cross-rail references to external governance receipts emitted by one or more external safety rails selected from the group consisting of a trusted reality compositor rail, a clinical safety rail, and a multi-harm Safety Risk Budget Engine, and (ii) treat the cross-rail references as evidentiary-only links that do not alter fail-closed admission predicates enforced by the ingress gate.

18. The system of claim 1, wherein the read/subscribe path includes at least one of:

(i) an operating system/hardware abstraction layer (OS/ HAL) bus submit or commit;

(ii) a firmware/real-time operating system (RTOS) driver commit;

(iii) an accelerator direct memory access (DMA) queue or fence;

(iv) a virtualization shim;

(v) a network offload device, including a smart network interface card (SmartNIC) or a data processing unit (DPU);

(vi) an image signal processor (ISP)/encoder pipeline;

(vii) a field-programmable gate array (FPGA)/application-specific integrated circuit (ASIC) bridge; or (viii) a gateway/proxy bridge;

and wherein gating occurs before subscriber visibility.

19. The system of claim 1, wherein a verifier timeout is treated as a Structured Precondition-Failure (code) with TIME_BUDGET_EXCEEDED and the event is dropped within the admission latency budget.

20. The system of claim 1, wherein under a snapshot-freshness policy a validator accepts a monotonic snapshot identifier (snapshot_id) issued by a transparency service and validates monotonic advancement within a policy window as an alternative to an append-only-evolution (consistency) proof.

21. The system of claim 1, wherein the ingress gate enforces a status-stapling recency bound for at least one of:

(i) a vector of head commitments; and (ii) a sensor-permit status; and staleness maps to STALE_HEAD.

22. The system of claim 1, wherein admission further requires a valid CalibrationCertificate for the sensor and denial maps to CALIBRATION_EXPIRED.

23. The system of claim 1, wherein k-of-m validators are required for acceptance and quorum disagreement maps to HOLD with a signed conflict record.

24. The system of claim 1, wherein continuity records link successive signed heads observed during validation.

25. The system of claim 1, wherein the S2 includes a trusted event time derived from a trusted clock comprising a trusted execution environment (TEE) monotonic counter combined with attested network time.

26. The system of claim 1, further configured to validate a plurality of S2 streams and emit a digitally signed batch attestation that enumerates, for each stream, head identifier(s) and proof reference(s).

27. The system of claim 1, wherein upon reaching a policy-defined threshold of Structured Precondition-Failures for a sensor or device within a policy window, the ingress gate enters a quarantine mode that isolates the sensor interface, emits a signed continuity record, and restricts admission to a Short-Permit (HOLD) profile until remediation is observed.

28. The system of claim 1, wherein admitting the sensor event further requires receipt of a digitally signed Certification Result that commits to the S2 receipt, the head identifier(s), and a verifier identity.

29. A computer-implemented method comprising:
(a) executing at least a portion of sensor acquisition within a trusted boundary;
(b) deterministically canonicalizing a sensor event and computing a Sensor Receipt (S2) having at least a boundary measurement, an input digest, a monotonic counter, a trusted event time, and an anti-replay tuple;

(c) anchoring a commitment of the S2 to an append-only log that publishes signed heads and supports inclusion and append-only-evolution (consistency) proofs under a freshness policy;
(d) validating inclusion under the freshness policy and, responsive to a head change within the freshness policy, validating an append-only-evolution (consistency) proof; and
(e) admitting the sensor event to an OS read/subscribe path only after successful validation, otherwise returning a Structured Precondition-Failure (code) and withholding the event.

30. A non-transitory computer-readable medium storing instructions that, when executed, cause one or more processors to perform operations comprising:
(a) executing at least a portion of sensor acquisition within a trusted boundary;
(b) deterministically canonicalizing a sensor event and computing a Sensor Receipt (S2) having at least a boundary measurement, an input digest, a monotonic counter, a trusted event time, and an anti-replay tuple;
(c) anchoring a commitment of the S2 to an append-only log that publishes signed heads and supports inclusion and append-only-evolution (consistency) proofs under a freshness policy;
(d) validating inclusion under the freshness policy and, responsive to a head change within the freshness policy, validating an append-only-evolution (consistency) proof; and
(e) admitting the sensor event to an operating-system (OS) read/subscribe path only after successful validation, otherwise returning a Structured Precondition-Failure (code) and withholding the event.

\* \* \* \* \*